United States Patent
Miyao et al.

[11] 3,969,958
[45] July 20, 1976

[54] OUTPUT SPLIT TYPE HYDROSTATIC TRANSMISSION

[75] Inventors: Takayuki Miyao; Hiroaki Maeda, both of Toyota; Masanori Sato, Nagoya; Toshimitsu Sakai, Toyota, all of Japan

[73] Assignees: Aisin Seiki Kabushiki Kaisha, Kariya; Jidosha Kogyo Kabushiki Kaisha, Toyota, both of Japan

[22] Filed: Mar. 25, 1974

[21] Appl. No.: 454,583

[30] Foreign Application Priority Data

Mar. 28, 1973 Japan.............................. 48-35294
May 31, 1973 Japan.............................. 48-60313
July 4, 1973 Japan.............................. 48-74900
May 23, 1973 Japan.............................. 48-56881
July 3, 1973 Japan.............................. 48-74411
July 4, 1973 Japan.............................. 48-76000

[52] U.S. Cl............................... 74/687; 74/720.5; 74/740
[51] Int. Cl.².................. F16H 47/04; F16H 37/06
[58] Field of Search............. 74/740, 687, 355, 377, 74/720.5

[56] References Cited
UNITED STATES PATENTS

| | | | |
|---|---|---|---|
| 3,090,253 | 5/1963 | Linsley et al. | 74/687 |
| 3,135,129 | 6/1964 | Merritt | 74/377 |
| 3,489,036 | 1/1970 | Cockrell et al. | 74/687 |
| 3,580,107 | 5/1971 | Orshansky, Jr. | 74/687 |
| 3,596,535 | 8/1971 | Polak | 74/687 X |
| 3,675,507 | 7/1972 | Takekawa | 74/687 |
| 3,714,846 | 2/1973 | Louis et al. | 74/687 |
| 3,736,813 | 6/1973 | Kress et al. | 74/740 |
| 3,783,711 | 1/1974 | Orshansky, Jr. | 74/687 |

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

A hydrostatic transmission includes a hydraulically controlled speed differential means drivingly connected with an output shaft for transmitting the rotation torque of an input shaft to the output shaft and including a hydraulic element functionable as a reaction element therefor, a hydraulic positive displacement pump-motor drivingly connected with the input shaft for controlling the hydraulic element in accordance with the displacement ratio thereof, and a line circuit to provide hydraulic communication between the hydraulic element and the pump-motor. In the hydrostatic transmission, a drive power train selector gear unit is disposed between the input shaft and the speed differential means to selectively complete the forward and reverse drive power trains inbetween the input shaft and the output shaft by way of the speed differential means.

17 Claims, 26 Drawing Figures

OUTPUT SPLIT TYPE HYDROSTATIC TRANSMISSION

BACKGROUND OF THE INVENTION

The present invention relates to an output split type hydrostatic transmission for a wheeled vehicle, industrial equipment and the like, and more particularly to an improved hydro-mechanical transmission which includes a hydraulically controlled speed differential means drivingly connected with an output means for transmitting the rotation torque of an input means to the output means and a hydraulic positive displacement pump-motor driven by the input means to hydraulically control a reaction element provided within the speed differential means in response to the displacement ratio thereof.

SUMMARY OF THE INVENTION

The prime object of the present invention is to provide an output split type hydrostatic transmission of the mentioned type, wherein a forward-reverse drive power train selector device is assembled operatively between the input means and the speed differential means, whereby synchronized meshing engagements in shifting operation of the selector device are realized in completing either of the forward or reverse drive power train by means of hydraulic torque exerted on the speed differential means in the initial pumping operation of the positive displacement pump-motor, thereby to effect smooth shifting operation from the forward drive power train to the reverse drive power train and vice versa.

Another object of the present invention is to provide an output split type hydrostatic transmission, having the above-mentioned characteristics, wherein torque transmission from the input means to the output means is conducted in the reverse drive power train as effectively as in the forward drive power train by effecting the positive displacement pump-motor fully from its negative or positive operation area.

A further object of the present invention is to provide an output split type hydrostatic transmission, wherein continuously variable drive ratios between the input and output means are obtainable over a wide speed range by way of continuous control of the displacement of the pump-motor.

Still another object of the present invention is to provide an output split type hydrostatic transmission, wherein high torque transmission efficiency is obtained in the continuously varying speed change ranges by means of an improved speed differential means for fully functioning the positive displacement pump-motor.

A still further object of the present invention is to provide an output split type hydrostatic transmission, wherein synchronized engagements of low and high range clutches for the speed differential means is selectively conducted at a mode switch-over of the positive displacement pump-motor to switch-over the transmission from its low speed power train to its high speed power train and vice versa.

Another object of the present invention is to provide an output split type hydrostatic transmission, wherein the component parts thereof are arranged to provide the most and simple compact arrangement to thereby provide a transmission of the desired characteristics which may be adopted to wheeled vehicles, industrial equipment and the like.

According to the present invention briefly summarized, there is provided with a hydrostatic transmission which includes an input means, an output means, a hydraulically controlled speed differential means drivingly connected with the output means for transmitting the rotation torque of the input means to the output means and including a first hydraulic positive displacement pump-motor functionable as a reaction element therefor, a second hydraulic positive displacement pump-motor of the variable type drivingly connected with the input means for controlling the first pump-motor in response to the displacement ratio thereof, and a line circuit for providing hydraulic communication between the first and second pump-motors. In the hydrostatic transmission, a drive power train selector gear unit is disposed between the input means and the speed differential means for selectively completing the forward and reverse drive power trains inbetween the input means and the output means by way of the speed differential means, whereby the speed differential means hydraulically and mechanically controls the driving power transmitted to the output means from the input means in response to the pumping and motor operations of the first pump-motor in accordance with the displacement ratio of the second pump-motor in the forward or reverse drive operation.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
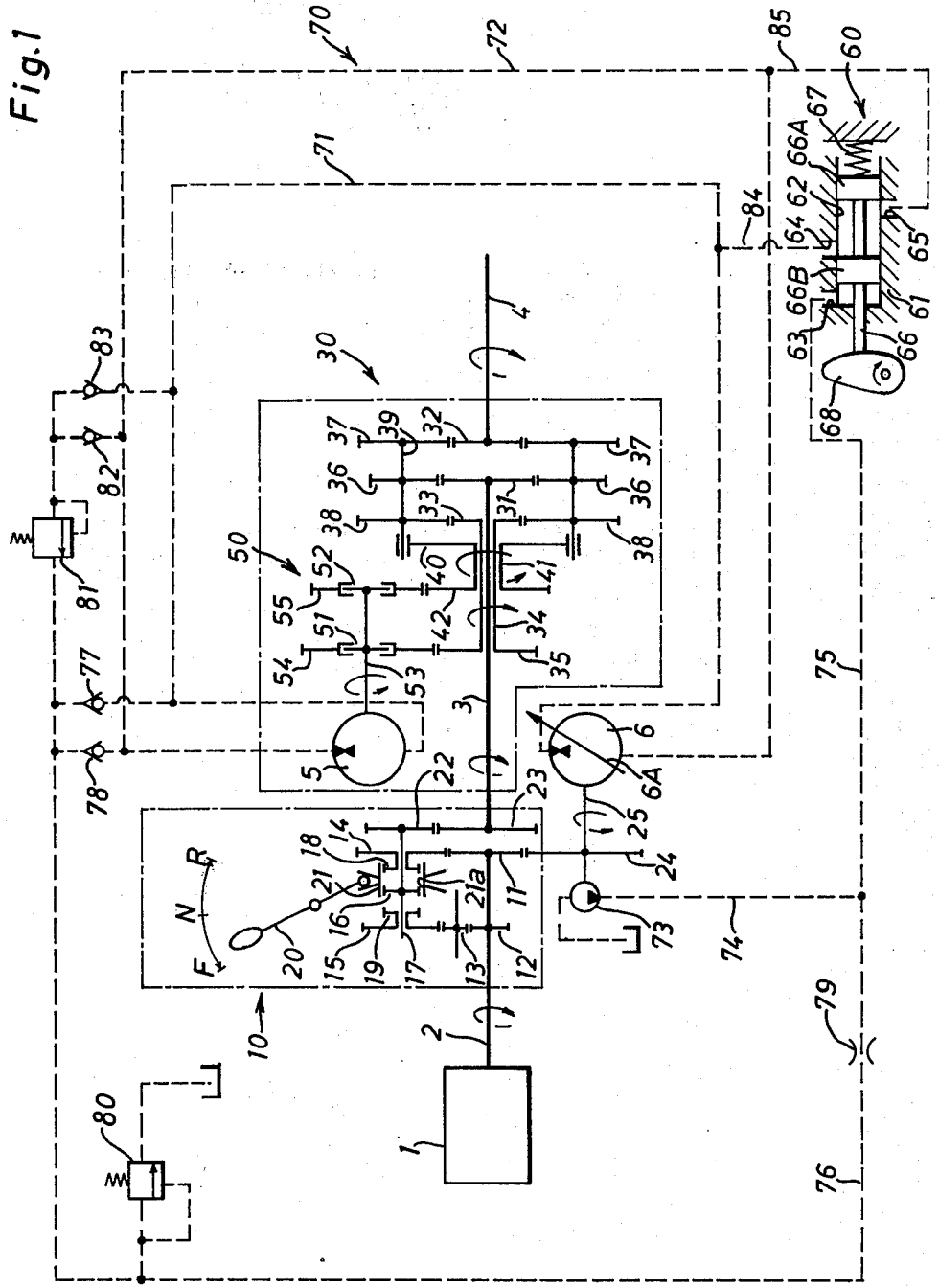
FIG. 1 is a schematic skeleton view showing a first preferred embodiment of a hydrostatic transmission according to the present invention.

Referring now in particular to FIG. 1 of the drawings, there is shown a first preferred embodiment of an output split type hydrostatic transmission in accordance with the present invention. The hydrostatic transmission may be seen to includes an input shaft 2 driven by a prime engine 1, an intermediate shaft 3 and an output shaft 4. These shafts 2, 3, and 4 are coaxially journalled on the transmission housing not shown in the figure, and the intermediate and output shafts 3 and 4 are in effect piloted with respect to the input shaft 2.

The transmission includes, in general, a forward-reverse drive power train selector gear unit 10 (hereinafter designated as a selector gear unit 10), a hydraulically controlled differential gear unit including a planetary gear set 30, a hydraulically operated clutch mechanism 50 and a first positive-displacement pump-motor 5 of the fixed type which is controlled by a second positive-displacement pump-motor 6 of the variable type to be driven by the prime engine 1. The first and second pump-motor 5 and 6 are hydraulically connected with each other by means of a hydraulic circuit 70 through a bypass valve 60.

The selector gear unit 10 is to determine a drive power train of the transmission and is provided with a manual selector level 20 which has such positions as F, N and R corresponding respectively to "Forward", "Neutral" and "Reverse" drive power trains. The selector gear unit 10 includes gears 11 and 12 secured on the input shaft 2, an idler gear 13 in mesh with the gear 12 and gears 14 and 15 which engage respectively with the gear 11 and the idler gear 13. The gears 14 and 15 are provided respectively with integral outer-splines 13 and 19 and are rotatably journalled on a counter shaft 17. The counter shaft 17 includes thereon an outer-spline 16 aligned therebetween with the splines 18 and 19. A gear 11 is fixed on the right end of the counter shaft 17 in the figure and in mesh with a gear 23 fixed on the intermediate shaft 3.

The selector gear unit 10 further includes a slide sleeve 21 having thereon an inner-spline 21a selectively engageable with the spline 16, with the splines 16 and 18 or with the splines 16 and 19. The slide sleeve 21 is operated by the selector lever 10. Shifting of the selector level 20 to its F position engages the sleeve 21 with the splines 16 and 18 to complete a drive power train by the gears 11, 14, 22 and 23, thereby to transmit the same rotation, which is clockwise in this example, of the input shaft 2 to the intermediate shaft 3. This completes the forward drive power train of the transmission.

When the selector lever 20 is conditioned to its R position, the sleeve 21 engages with splines 16 and 19 to complete a drive power train by the gears 12, 13, 15, 22 and 23, thereby to transmit the clockwise rotation of the input shaft 2 reversely to the intermediate shaft 3 which now rotates counterclockwise. This completes the reverse drive power train of the transmission. Positioning the selector lever 20 to its N position keeps the sleeve 21 disengaged from either of the splines 18 or 19, thereby no torque-transmission is made from the input shaft 2 to the intermediate shaft 3.

The planetary gear unit 30 includes a first sun gear 31 fixed on the outer end of the intermediate shaft 3, a second sun gear 32 fixed on the inner end of the output shaft 4 and a third sun gear 33 formed at the outer end of an auxiliary shaft 34 wehich is rotatably supported by the intermediate shaft 3 and provided with a gear 35 thereon at its inner end. These three sun gears 31, 32 and 33 are coaxially aligned. The planetary gear unit 30 further comprises a set of planet gears 36, 37 and 38. The planet gears 36, 37 and 38 are coaxially fixed on a shaft 399 to mesh respectively with the first, second and third sun gears 31, 32 and 33. The shaft 39 is journalled by a carrier 40 of which an auxiliary shaft 41 is rotatably disposed in surrounding relationship to the auxiliary shaft 34 of the third sun gear 33 and provided with a gear 42 secured on the inner end thereof.

The hydraulically operated clutch mechanism 50 includes a low range clutch 51 and a high range clutch 52 coaxially provided on a shaft 53 of the first fluid pump-motor 5. These clutches 51 and 52 include respectively gears 54 and 55 in mesh with the gears 35 and 42.

The second positive-displacement pump-motor 6 has a swash plate 6A to vary the displacement capacity thereof. A shaft 25 of the pump-motor 6 is connected to the input shaft 2 by way of a gear 24 fixed on the shaft 25 and in mesh with the gear 11 of the input shaft 2 to be driven by the engine 1 always at a constant rotation ratio. The hydraulic line circuit 70 to connect the first pump-motor 5 with the second pump-motor 6 includes substantially a first line circuit 71 and a second line circuit 71. The hydraulic line circuit 70 further includes a small fluid pump 73 driven by the shaft 25 of the second pump-motor 6 to compensate for hydraulic leakage from the pump-motors and to supply an operation pilot pressure into the bypass valve 60.

The bypass valve 60 includes a valve casing 61 provided therein with a cylindrical bore 62 and thereon with ports 63, 64 and 65. A spool 66 engages slidably within the bore 62 and is provided with lands 66A and 66B. A spring 67 biases the spool 66 normally leftward in the figure and a cam 68 engages with the outer end of the spool 66. The displacements of the spool 66 are caused by the cam 68 or the pilot pressure from the pump 73 to open or close the ports 64 and 65.

The pump 73 is connected to a discharge circuit 74 which is bifurcated into two branch circuits 75 and 76. The branch circuit 75 is in communication with the port 63 of the bypass valve 60. Meanwhile, the branch circuit 76 is connected to the first line circuit 71 by way of a one-way check valve 77 and also to the second line circuit 72 by way of a one-way check valve 78. An orifice 79 is provided within the branch circuit 76 near the junction of the discharge circuit 74, thereby to apply the hydraulic pressure from the pump 73 to the branch circuit 75 responsive to rotation of the engine 1. Connected to the branch circuit 76 is a relief valve 80 for regulating the hydraulic pressure within the circuit 76 at a predetermined low value of 5 through 10 kg/cm². The branch circuit 76 is further connected to the first and second line circuits 71 and 72 respectively by way of a relief valve 81 and a one-way check valve 83 and by way of the relief valve 81 and a one-way check valve 82. The relief valve 81 acts as a safety valve for the line circuit 70 to prevent the line circuit 70 from breakage by extraordinary increases of the hydraulic pressure within the line circuit 70.

The first line circuit 71 is in open communication with the port 64 of the bypass valve 60 by way of a bypass circuit 84. The second line circuit 72 is in open communication with the port 65 of the bypass valve 60 by way of a bypass circuit 85. Thus, while the engine 1 is conditioned to its idling rotation, the spool 66 of the bypass valve 60 stays at its original position as illustrated in the figure, the pressure applied to the port 63 being balanced with the bias of the spring 67. In this instance the ports 64 and 65 are connected to each other, thereby to complete communication between the first and second line circuits 71 and 72. When the engine rotation exceeds its idling mode, the pilot pressure supplied to the port 63 overcomes the bias of the spring 67 and displaces the spool 66 rightward in the figure. The land 66B closes the port 64 and the communication between the first and second line circuits 71 and 72 is blocked. Consequently, a circulating circuit between the first and second pump-motors 5 and 6 is completed. This circulating circuit can also be completed by turning the cam 68 towards an arrow mark in the figure.

For this purpose, the cam 68 is interlocked with the selector lever 20 of the selector gear unit 10 so that during the idling rotation of the engine 1, the cam 68 is actuated prior to the completion either of the forward or reverse drive power train within the selector gear unit 10. The cam 68 is, then, released soon after the completion either of the forward or reverse drive power train. The cam 68 will, when actuated, push the spool 66 of the bypass valve 60 against the bias of the spring 67, thereby to temporarily close the port 64 by the land 66B of the spool 66. When the cam 68 is released, the spool 66 returns to its original position by way of the bias of the spring 67. Consequently, the bypass valve 60 returns to its original state wherein the ports 64 and 65 are connected to each other. Sequentially, the pilot pressure applied to the port 63 is increased in response to the increase of the engine rotation after completion of the shifting of the lever 20, thereby to hydraulically actuate the spool 66 rightward in the figure.

In the shifting operation of the selector gear unit 10, a meshing engagement between the slide sleeve 21 and the spline 18 of the gear 14 or the spline 19 of the gear 15 is synchronously conducted to complete either of the forward or reverse drive power train, since the hydraulically controlled differential gear unit is operated by the first pump-motor 5 which is hydraulically interlocked with the second pump-motor 6 prior to the shifting operation of the selector lever 20, as described below in detail.

When the selector lever 20 is positioned at its N position during the idling of the engine 1, no rotation torque of the engine is transmitted to the intermediate shaft 3 and the bypass valve 60 stays in its inoperative condition to interrupt the fluid communication between the first and second pump-motors 5 and 6. Under this state, the second pump-motor 6 and the small pump 73 merely keep their idling rotation. Sequentially, for the shifting operation of the selector gear unit 10, the second pump-motor 6 is conditioned to its full displacement in a positive direction and the low range clutch 51 is engaged.

Thus, the cam 68 of the bypass valve 60 is operated in response to the shifting operation of the selector lever 20 to its F position so as to temporarily complete the circulating circuit between the first and second pump-motors 5 and 6 in advance to the completion of the forward drive power train within the selector gear unit 10. Then, the first pump-motor 5 is rotated counter-clockwise as a motor by the fluid pressure applied thereon from the second pump-motor 6 through the second line circuit 72. The counter-clockwise rotation torque of the shaft 53 of the pump-motor 5 is transmitted to the intermediate shaft 3 as its clockwise rotation torque by way of the low range clutch 51, the gears 54 and 35, the auxiliary shaft 34, the third sun gear 33, the planet gears 38 and 36, and the first sun gear 31 in sequence. Meanwhile, the output shaft 4 is locked by the load exerted thereon. This rotation torque is transmitted to the counter shaft 17 of the selector gear unit 10 through the gears 23 and 22. Consequently, the counter shaft 17, the outer spline 16 and the slide sleeve 21 make their common rotation in the same direction as the spline 18 of the gear 14 in mesh with the gear 11 for the mentioned synchronous meshing engagement.

For the completion of the reverse drive power train, in the conditions as mentioned for the forward drive power train, the second pump-motor 6 is switched over to its full displacement in a negative direction. The second pump-motor 6 discharges fluid pressure into the first line circuit 71 and the first pump-motor 5 is rotated clockwisely. The clockwise rotation of the shaft 53 of the first pump-motor 5 is transmitted to the intermediate shaft 3 by way of the low range clutch 51 and the same gearing as mentioned for the forward drive power train. Then, this rotation torque is conveyed to the counter shaft 17 by way of the gears 23 and 22 to rotate the counter shaft 17 clockwise so as to realize the synchronous meshing engagement between the sleeve 21 and the spline 19 of the gear 15.

Through the above-mentioned ways of completing the forward or reverse drive power train and the descriptions to be made hereinafter, it should be well understood that the torque transmission by the reverse drive power train can be conducted substantially the same as is done by the forward drive power train.

In the forward low speed or low range stage of operation, after the synchronized meshing engagement between the slide sleeve 21 and the spline 18 of the gear 14 is completed by means of the shifting operation of the selector gear unit 10, the clockwise rotation torque of the input shaft 2 given from the engine 1 in its idling rotation is applied to the first pump-motor 5 by way of a low range speed gear train including the gears 11, 14 and 22 within the selector gear unit 10, the gear 23 and the first sun gear 31 on the intermediate shaft 3, the planet gears 36 and 38, the third sun gear 33 and the gear 35 on the auxiliary shaft 34 and the gear 54 of the low range clutch means 51. Simultaneously, the clockwise rotation torque of the input shaft 2 is transmitted to the second pump-motor 6 and the small pump 73 across the gears 11 and 24, and is further applied to the output shaft 4 by way of an output planetary gear train including the gears 11, 14 and 22 within the selector gear unit 10, the gear 23 and the first sun gear 31 on the intermediate shaft 3, the planet gears 36 and 37, and the second sun gear 32.

In this state, the bypass valve 60 is conditioned to its inoperative position to connect the first and second line circuits 71 and 72 so that no load is given to the first pump-motor 5, and the output shaft 4 is arrested by load exerted thereon. Meanwhile, the low range speed gear train is driven by the rotation torque of the input shaft 2 to rotate the first pump-motor 5, and on the other hand, the output planetary gear train is locked by the load on the output shaft 4.

When the engine 1 is accelerated, which applies fluid pressure to the port 63 of the bypass valve 60 to cause the spool 66 to move rightward against the bias of the spring 67, the first and second line circuits 71 and 72 are isolated from each other, thereby to complete the circulating circuit for the first and second pump-motors 5 and 6. Thus, the hydraulic pressure discharged from the first pump-motor 5 passes necessarily through the second pump-motor 6 so that the pressure amount discharged from the first pump-motor 5 is regulated by the second pump-motor 6.

Under the mentioned state, while the second pump-motor 6 is conditioned to its full displacement in the positive direction, the output shaft 4 may not be driven since the pertaining gears are designed to equalize the fluid pressure amounts discharged respectively from the first and second pump-motors 5 and 6 per rotation of the input shaft 2.

As the pump displacement of the second pump-motor 6 is decreased, a hydraulic load is exerted on the first pump-motor 5 in accordance with the pump angle of the second pump-motor 6 to decrease the rotation speed of the first pump-motor 5 below that while the output shaft 4 is arrested. Thus, the output planetary gear train transmits to the output shaft 4 the rotation torque of the input shaft 2 in response to the reaction force exerted thereon from the low range gear train in accordance with the decrease of the rotation of the first pump-motor 5.

The rotation of the output shaft 4 is increased either by the increase of the engine rotation or the further decrease of the pump-angle of the second pump-motor 6. The increase of the engine rotation and the decrease of the pump-angle of the second pump-motor 6 may be conducted either independently to each other or relatively. This causes the first pump-motor 5 to decrease its rotation per rotation of the input shaft 2 and, in turn, the output shaft 4 to increase its rotation per rotation of the input shaft 2. Thus, the rotation speed ratio of the output shaft 4 against the input shaft 2, which is hereinafter simply called "speed ratio", increases in proportion to the decrease of the pump displacement of the second pump-motor 6.

When the second pump-motor 6 is conditioned to its zero-displacement, no fluid pressure can pass through the second pump-motor 6, thereby to arrest the rotation of the first pump-motor 5. The mentioned speed ratio under this state is defined to be a first or low range standard speed ratio which is determined by gear ratios between the first sun gear 31 and the planet gear 36, between the second sun gear 32 and the planet gear 37, between the third sun gear 33 and the planet gear 38, between the gears 11 and 14 of the selector gear unit 10, and between the gears 22 and 23 of the selector gear unit.

At this first standard speed ratio, all the engine torque conveyed to the input shaft 2 as clockwise rotation torque is transmitted to the intermediate shaft 3 as its clockwise rotation torque by way of the selector gear unit 10. The rotation torque of the intermediate shaft 3 is further transmitted mechanically to the output shaft 4 as its clockwise rotation torque by way of the output planetary gear train.

Moreover, until the first standard speed ratio is obtained, the engine torque transmitted to the intermediate shaft 3 is divided into the output planetary gear train and the low range gear train. The rotation torque given to the low range gear train is then converted into hydraulic pressure by the pumping operation of the first pump-motor 5. The fluid pressure from the first pump-motor 5 is applied to the second pump-motor 6 by way of the first line circuit 71. Then, the second pump-motor 6 conducts its motor action by the fluid pressure applied thereon, thereby to produce counter-clockwise rotation of the shaft 25. Consequently, one of the bifurcated rotation torque is fed back to the input shaft 2 by way of the gears 24 and 11.

In the case where the pump-angle of the second pump-motor 6 is over-centered or positioned in the negative direction, the rotation torque of the input shaft 2 is divided into first and second mechanical power paths. The first divided rotation torque is transmitted to the output shaft 4 as its clockwise rotation torque by way of the output planetary gear train as mentioned above. The second divided rotation torque of the input shaft 2 rotates the second pump-motor 6 as a pump by way of the gears 11, 24 and the saft 25, and is then converted into hydraulic pressure by the pumping operation of the second pump 6. This hydraulic pressure is then applied to the first pump-motor 5 through the first line circuit 71.

The first pump-motor 5 conducts its motor operation to convert the hydraulic pressure into the counter-arrow or counter-clockwise rotation torque of the shaft 53 of the first pump-motor 5. This rotation torque is finally transmitted to the output shaft 4 as its clockwise rotation torque by way of the low range gear train. In proportion to the increase of the displacement in the negative direction of the second pump-motor 6, the discharging amount of the pump-motor 6 per rotation of the input shaft 2 increases to proportionately increase the rotation torque of the first pump-motor 5, thereby to increase the speed ratio of the hydrostatic transmission over the first standard speed ratio.

After the second pump-motor 6 is conditioned to its full negative displacement, the speed ratio of the transmission is further increased by a procedure such that in the clutch engagement mechanism 50, the high range clutch 52 is engaged and the low range clutch 51 is disengaged. In this instance, most desirably the rotation speeds of the gears 54 and 55 are synchronized, which is realizeable by proper selection of gear ratios between the gears 35 and 54, and between the gears 42 and 55.

Upon the engagement of the high range clutch 52, all the clockwise rotation torque of the input shaft 2 driven by the engine 1 is transmitted to the intermediate shaft 3 as its clockwise rotation torque across the selector gear unit 10 and, in turn, is divided into the mentioned first and second power paths within the planetary gear set 30. The first divided rotation torque is transmitted to the output shaft 4 as its clockwise rotation torque by way of the output planetary gear train. On the other hand, the second divided rotation torque is conveyed to the shaft 53 of the first pump-motor 5 as its counter-arrow or clockwise rotation torque by way of a high range gear train including the first sun gear 13, the planet gear 36, the shaft 39, the carrier 40, the auxiliary shaft 41, the gears 42, 55 and the high range clutch 52.

This rotation torque of the shaft 53 is converted into hydraulic pressure by pumping operation of the first pump-motor 5. The hydraulic pressure is then applied to the second pump-motor 6 by way of the second line circuit 72 and converted into the counter-clockwise rotation torque of the shaft 25 of the second pump-motor 6. This rotation torque is finally fed back to the input shaft 2 as its clockwise rotation torque by way of the gears 24 and 11.

In the case where the displacement of the second pump-motor 6 is sequentially decreased and returned to its zero-displacement, the displacement capacity of the second pump-motor 6 becomes zero, thereby to arrest the rotation of the first pump-motor 5. The speed ratio under the mentioned stage is defined as a second or high-range standard speed ratio which is determined by gear ratios between the first sun gear 31 and the planet gear 36, between the second sun gear 32 and the planet gear 37, between the gears 11 and 14 of the selector gear unit 10, and between the gears 22 and 23 of the selector gear unit 10. At the high range standard speed ratio, all of the rotation torque of the input shaft 2 is mechanically transmitted to the output shaft 4 by way of the output planetary gear train as completed at the low range standard ratio.

Further displacement of the second pump-motor 6 over its zero-position towards the positive direction will rotate the first pump-motor 5 counter-clockwise, thereby to increase the speed ratio. In this instance, the first and second pump-motors 5 and 6 conduct respectively the motor operation and the pumping operation. The first divided rotation torque from the input shaft 2 is transmitted to the output shaft 4 as its clockwise rotation torque by way of the output planetary gear train. And the second divided rotation torque from the input shaft 2 is transmitted to the shaft 25 of the second pump-motor 6 as its counter-clockwise rotation torque by way of the gears 11 and 24. This rotation torque is converted into hydraulic pressure by the second pump-motor 6. The hydraulic pressure is then applied to the first pump-motor 5 through the second line circuit 72 and reproduced to be the counter-clockwise rotation torque of the shaft 53 of the first pump-motor 5. The rotation torque is finally given to the output shaft 4 as its clockwise rotation torque by way of the high speed range gear train.

To increase the positive displacement of the second pump-motor 6 ends in the proportional increase of the counter-clockwise rotation of the first pump-motor 5 per rotation of the input shaft 2 to increase the speed ratio which will reach its maximum value when the second pump-motor 6 is conditioned to its full displacement in the positive direction. And also the reverse operation of that above-mentioned will decrease the speed ratio.

The unique operation of the hydrostatic transmission in accordance with the present invention in the reverse drive is described hereinafter in detail. Through the following description, it should clearly be noted as one of the most important subject matters of the present invention that the rotation torque transmission in the reverse drive can be realized substantially in the same manner and as well as in the forward drive with one difference in the starting state to condition the second pump-motor 6 to its full displacement in the negative direction.

Upon the synchronized meshing engagement between the slide sleeve 21 and the spline 19 of the gear 15 by means of the shifting operation of the selector lever 20 shifted to its R position so as to complete the reverse drive power train, the clockwise rotation torque of the input shaft 2 during the idling rotation of the engine 1 is applied to the first pump-motor 5 by way of the low speed range gear train. Simultaneously, the clockwise rotation torque of the input shaft 2 is transmitted to the second pump-motor 6 and the small pump 73 by the meshing engagement between the gears 11 and 24, and is further applied to the output shaft 4 through the output planetary gear train.

In this state, the bypass valve 60 is conditioned to is inoperative position to communicate the first line circuit 71 with the second line circuit 72 so that no load is given to the first pump-motor 5, and the output shaft 4 is arrested by load exerted thereon. Meanwhile, the low speed range gear train is driven by the rotation torque of the input shaft 2 to rotate the first pump-motor 5 clockwise, and on the other hand, the output planetary gear grain is locked by the load on the output shaft 4. Moreover, in this reverse drive operation, the second pump-motor 6 is conditioned to its full displacement in the negative direction.

When the engine 1 is accelerated, which applies fluid pressure to the port 63 of the bypass valve 60 to cause the spool 66 to move rightward against the bias of the spring 67, the first and second line circuits 71 and 72 are isolated to each other, thereby to complete the circulating circuit for the first and second pump-motors 5 and 6. Thus, the hydraulic pressure discharged from the first pump-motor 5 passes necessarily through the second pump-motor 6 so that the pressure amount applied from the first pump-motor 5 is regulated by the second pump-motor 6.

As the pump displacement of the second pump-motor 6 is decreased towards the positive direction, a hydraulic load is exerted on the first pump-motor 5 proportionately to the pump angle of the second pump-motor 6 to decrease the rotation speed of the first pump-motor 5 below that while the output shaft 4 is arrested. Thus, the output planetary gear train transmits to the output shaft 4 the rotation torque of the input shaft 2 as the reverse drive power torque in response to the reaction force exerted thereon from the low speed range gear train in accordance with the increase of the load exerted on the first pump-motor 5 from the second pump-motor 6.

Further changes of the speed ratio can be made by varying the displacement of the second pump-motor 6 and by selective engagement of the low and high range clutches 51 and 52. The detailed operation in accordance with the changes of the speed ratio is eliminated as should well be understood through the description in detail in regard to the forward drive operation.

Although the above first preferred embodiment discloses such a hydrostatic transmission as to obtain low and high range standard speed ratios, one standard speed ratio may be able to cover all the disclosed operations. The synchronous-meshing type of selector gear unit 10 is adopted in the first preferred embodiment, but it may be replaced with a selectively sliding type.

A second preferred embodiment of the hydrostatic transmission in accordance with the present invention is disclosed hereinafter particularly in reference with FIG. 2. This second embodiment includes in general the prime engine 1, the input, intermediate and output shafts 2, 3 and 4, the forward-reverse drive power train selector gear unit 10, the hydraulically operated clutch mechanism 50, the first and second fluid pump-motors 5 and 6 including a closed hydraulic line circuit 170 therefor and a differential gear unit or planetary gear unit 130. The distinguishing differences from the first embodiment are observed in the construction of the planetary gear unit 130 and the hydraulic line circuit 170 which is now of a closed type excluding the bypass valve 60, the pump 73, other accessary valves and the like adopted in the first embodiment.

The constructions of the selector gear unit 10, the clutch mechanism 50 and the pump-motors 5 and 6 are the same as those in the first preferred embodiment. Thus, the same reference numerals indicate the same component parts and portions and eliminated are repetition of the explanations already made in the previous embodiment. Meanwhile, the clutch mechanism 50 and the first and second pump-motors 5 and 6 conduct their roles of operation differently from the first embodiment, which will be clearly readable in the following detailed descriptions.

In the second embodiment, the planetary gear unit 130 includes a first single planetary gear set 135 for a low speed range gear train and a second single planetary gear set 140 for a high speed range gear train. The first single planetary gear set 135 includes a sun gear 131 integrally mounted on the outer end of the intermediate shaft 3, a planet gear 133 journalled by a carrier 132 which is connected to the output shaft 4, and a ring gear 134. The second single planetary gear set 140 includes a sun gear 136, a planet gear 138 journalled by a carrier 137 which is connected to the intermediate shaft 3, and a ring gear 139 integrally formed with the carrier 132. The sun gear 136 and the ring gear 134 are respectively provided integrally with gears 146 and 147. The gears 146 and 147 are in mesh respectively with the gear 54 of the clutch 51 to be operated as a high range clutch and the gear 55 of the clutch 52 to be operated as a low range clutch.

Figure 5:
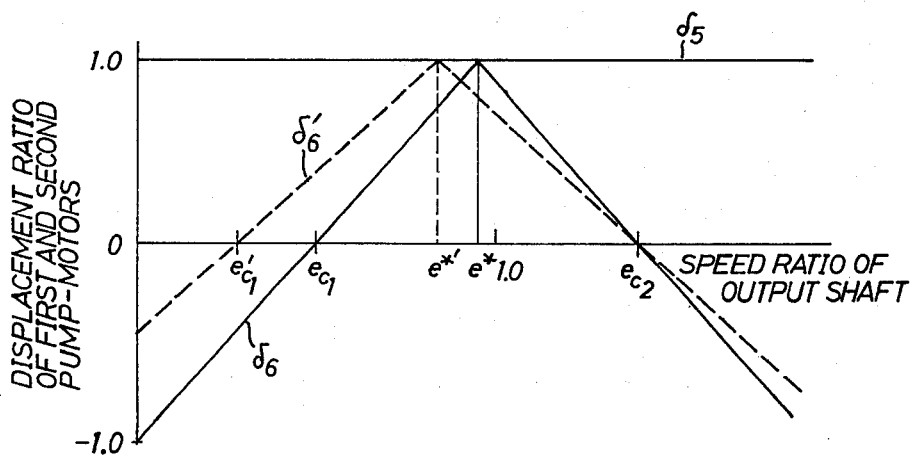
FIGS. 5, 6 and 7 are graphic charts illustrating certain operating characteristics of the second embodiment shown in FIG. 2.
Figure 6:
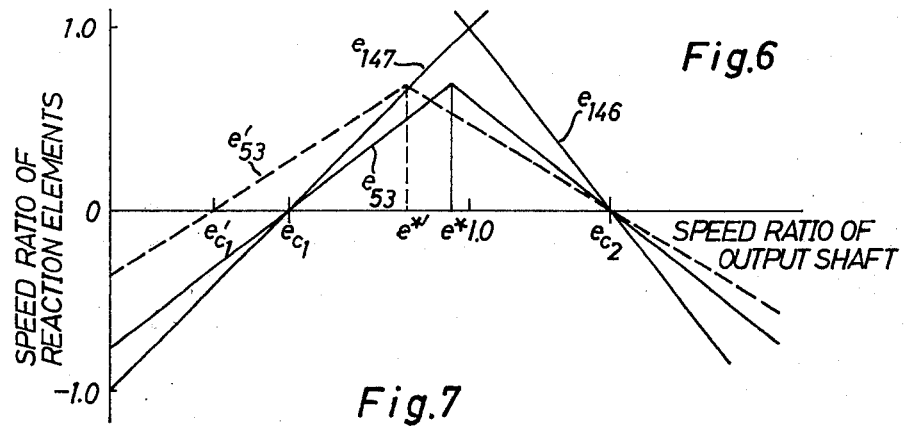

The operation of the above-disclosed transmission can well be explained in reference with FIGS. 5 and 6 illustrating characteristic lines. In FIG. 5, the axis of abscissa indicates the rotation speed ratio of the output shaft 4 against the rotation of the intermediate shaft 3 and the axis of ordinate indicates the displacement ratio of the pump-motors 5 and 6 against their full displacements; the displacements of the pump-motors 5 and 6 are respectively represented by lines $\delta_5$ and $\delta_6$. In FIG. 6, lines $e_{53}$, $e_{146}$ and $e_{147}$ indicate respectively the rotation ratios of the shaft 53 of the first pump-motor 5, the gear 146 and the gear 147 against the rotation of the intermediate shaft 3.

The selector gear unit 10 is positioned to its F condition for transmitting the clockwise rotation torque of the input shaft 2 to the intermediate shaft 3 which now makes its clockwise rotation. The low range clutch 52 is engaged to connect the shaft 53 of the first pump-motor 5 to the first planetary gear set 135 for the low speed gear train. While the displacement ratio $\delta_6$ of the second pump-motor 6 stays within the negative range, the transmission operates in its low speed ratio range, as as the displacement ratio $\delta_6$ approaches the zero value from its negative maximum value, the output shaft 4 rotates. In this instance, a portion of the torque conveyed to the first planetary gear set 135 from the intermediate shaft 3 is transmitted to the shaft 53 of the first pump-motor 5 by way of the low range clutch 52. This operates the first pump-motor 5 as a pump and, in turn, the second pump-motor 6 as a motor. Thus, the torque in the form of hydraulic energy is returned to the intermediate shaft 3. Consequently, the mechanical reaction torque produced within the first planetary gear set 135 is applied to the output shaft 4 as output torque.

In the low speed ratio range, in accordance with decreases of the displacement ratio $\delta_6$ in its absolute value from the maximum, the torque given to the pump-motors 5 and 6 is decreased to minimize the speed ratios $e_{147}$ and $e_{53}$, which consequently causes continuous increase of the rotation speed of the output shaft 4. When the displacement ratio $\delta_6$ of the second pump-motor 6 turns to be zero, the first pump-motor 5 stops its pumping operation. This arrests the ring gear 134 and all the rotation torque of the intermediate shaft 3 is mechanically transmitted to the output shaft 4. The speed ratio in this instance is called the first or low speed range standard speed ratio $e_{c1}$.

When the displacement ratio $\delta_6$ of the second pump-motor 6 is increased in its positive direction, a portion of the torque from the input shaft 2 is transmitted to the second pump-motor 6 which, then, conducts its pumping operation. And, in turn, the first pump-motor 5 is conditioned to its motor operation. Consequently, the rotation torque from the input shaft 2 is mechanically transmitted to the output shaft 4 by way of the first planetary gear set 135 and at the same time the hydraulic torque from the second pump-motor 6 is transmitted to the output shaft 4 across the first planetary gear set 135 by means of the motor action of the first pump-motor 5, thereby to accelerate the rotation of the output shaft 4.

When the displacement ratio $\delta_6$ of the second pump-motor 6 reaches its positive maximum value, the rotations of the shaft 53 of the first pump-motor 5 and the gear 54 which has been idling are synchronized to conduct a mode switch-over speed ratio $e$. Thus, the transmission operation moves in its high speed ratio range from its low speed ratio range by way of disengagement of the low range clutch 52 and engagement of the high range clutch 51 at the said mode switch-over speed ratio.

In the variable changes of the speed ratio in the low speed ratio range, as well observed in FIG. 5, the displacement ratio $\delta_6$ of the second pump-motor 6 is varied in a range of $\pm 1$ and as well shown by the characteristic line $e_{53}$ in FIG. 6, the rotation speed of the shaft 53 of the first pump-motor 5 is varied in a range from its negative maximum to its positive maximum. The mentioned mode switch-over speed ratio $e$ takes a value closer to 1.0 in comparison with the displacement ratio $\delta_6'$ and rotation speed ratio $e_{53}'$ of the conventional type transmission, which are indicated with broken lines in FIGS. 5 and 6. Furthermore, the standard speed ratio $e_{c1}$ takes approximately a half value of the mode switch-over speed ratio $e$. The values realized are practically the maximum value when the rotation speed limit and operation effeciency of the first pump-motor 5 are taken in consideration.

In the high speed ratio range, when the displacement ratio $\delta_6$ of the second pump-motor 6 is decreased, the first pump-motor 5 starts its pumping operation to subsequently let the second pump-motor 6 make its motor operation. Thus, the hydraulic torque applied from the first pump-motor 5 is fed back to the intermediate shaft 3 and the shaft 53 of the first pump-motor 5 decreases the rotation of the sun gear 136 of the second planetary gear unit 140. Then the torque given to the carrier 137 of the second planetary gear unit 140 from the intermediate shaft 3 is continuously increased and transmitted to the output shaft 4.

When the displacement ratio $\delta_6$ of the second pump-motor 6 turns zero, the first pump-motor 5 stops its discharging to arrest the rotation of the shaft 53. This locks the sun gear 136 and all the rotation torque from the intermediate shaft 3 is mechanically transmitted to the output shaft 4. The speed ratio in this instance is called the second or high speed range standard speed ratio $e_{c2}$.

In increasing of the displacement ratio $\delta_6$ in its negative range, the second pump-motor 6 conducts its pumping operation to drive the first pump-motor 5 so that the second planetary gear set 140 receives mechanical torque from the intermediate shaft 3 and hydraulic torque from the first pump-motor 5. Consequently, the rotation ratio of the output shaft 4 is further increased and will reach to its maximum value when the displacement ratio $\delta_6$ becomes $-$ 1. Moreover, the reverse procedures of the operation to increase the speed ratio as above-mentioned will decrease the speed ratio.

Figure 7:
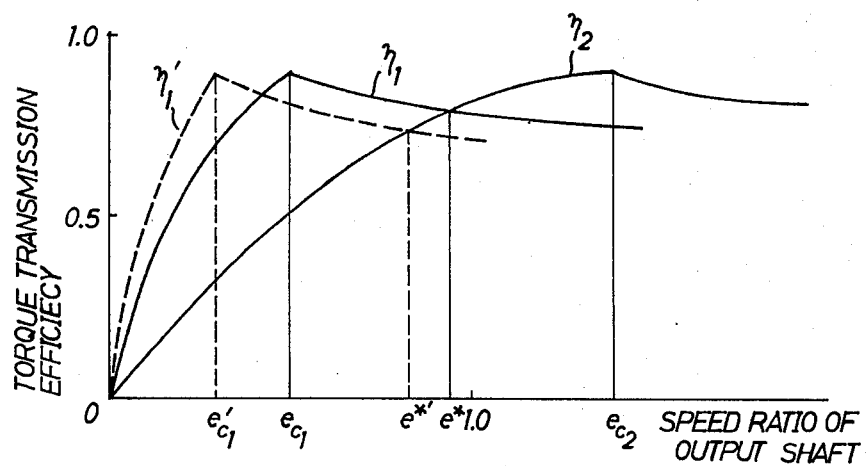

FIG. 7 indicates the torque transmission efficiency in the above-mentioned forward drive power train. In the figure, reference characters $\eta_1$ and $\eta_2$ represent respectively the efficiency in the low speed ratio range operation by means of the first planetary gear set 135 and the high speed ratio range operation by means of the second planetary gear set 140. The efficiencies $\eta_1$ and $\eta_2$ rise in accordance with the increase of the speed ratio and reach their maximums respectively at the first and second standard speed ratios $e_{c1}$ and $e_{c2}$ and, then, decrease. The efficiencies $\eta_1$ and $\eta_2$ are observed to be equalized at the mode switch-over speed ratio $e$.

In this embodiment, the over-all torque transmission efficiency is obtained by combination of the low and high speed ratio range operations with the switch-over point at the mode switch-over speed ratio $e$. Thus, the torque transmission efficiency at the mode switch-over speed ratio $e$ is maintained in a higher value in comparison with the efficiency of the conventional type transmissions, which is indicated with a broken line $\eta'_1$ in FIG. 7.

The reverse drive power train is completed by shifting the selector lever 20 of the selector gear unit 10 to its R position, wherein the clockwise rotation torque of the input shaft 2 is transmitted to the intermediate shaft 3 as the counter-clockwise rotation torque therefor. Then, the low range clutch 52 is engaged and the displacement ratio of the second pump-motor 6 is decreased from its maximum value in the positive displacement range. This enables the reverse drive of the output shaft 4 on the same variable speed ratio as in the forward drive. Furthermore, the switching-over of the drive power train from its forward condition directly to its reverse condition can smoothly be conducted by synchronizing the rotations of the splines 18 and 19 of the selector gear unit 10 by way of selection of gear ratios and displacement ratios.

When the selector lever 20 of the selector gear unit 10 is conditioned to its N position to block the torque transmission from the input shaft 2 to the intermediate shaft 3, realized is merely the circulation of operation fluid between the first and second pump-motors 5 and 6, the rotation of the input shaft 2 activating the second pump-motor 6. Thus, no hydraulic pressure is produced to a reaction force within the planetary gear unit 130 and the neutral condition of the transmission is maintained.

Figure 3:
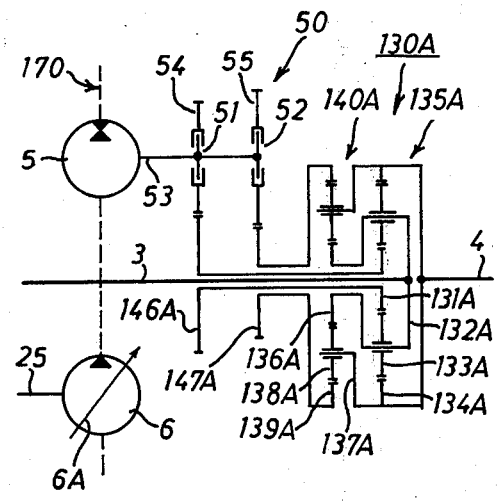
FIGS. 3 and 4 illustrate partial skeleton diagrams of first and second modifications of the second preferred embodiment.

FIG. 3 illustrates a first modification of the second embodiment. The modification is distinguished for its differential gear unit 130A and all other constructions and functions remain unchanges with the same reference numerals for the same component parts and portions.

The differential gear unit 130A includes generally a first and a second planetary gear sets 135A and 140A. A carrier 132A of the first planetary gear set 135A is connected with the intermediate shaft 3 and a sun gear 136A of the second planetary gear set 140A. In this modification, a sun gear 131A of the first planetary gear set 135A and a ring gear 139A of the second planetary gear set 140A are designed to be reaction elements and connected respectively with gears 146A and 147A which are in turn in mesh with the gears 54 and 55 of the low and high range clutches 51 and 52.

With this first modification, the speed changes in the low and high speed ratio ranges are conducted respectively in respect of the gear ratios of the second and first planetary gear sets 140A and 135A. All other operation features and procedures are the same as in the previous instances and no repetition is made. Consequently, in this first modification, eliminated is the connecting member from the outer circumference of the ring gear 139, as viewed in FIG. 2, and added is the carrier 132A between the sun gear 136A and the intermediate shaft 3, thereby to enable a small over-all size for the differential gear unit 130A.

Figure 2:
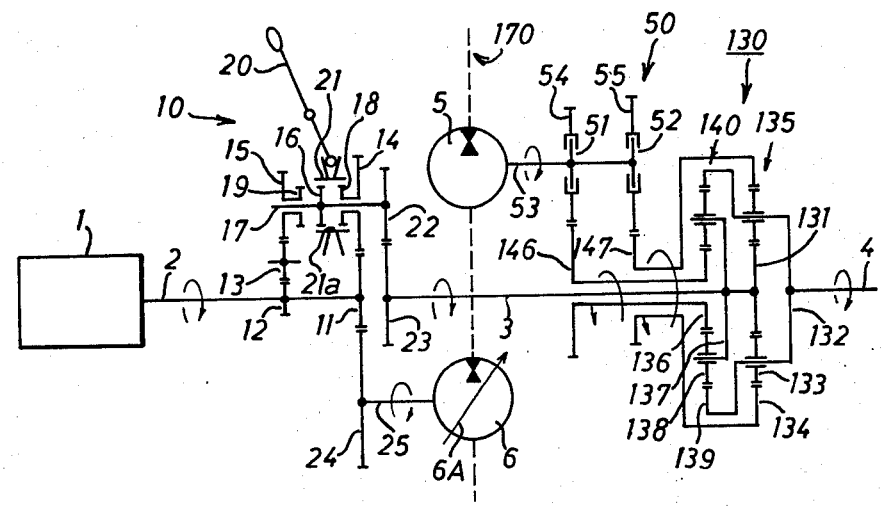
FIG. 2 is a schematic skeleton view showing a second preferred embodiment of the hydrostatic transmission.
Figure 4:
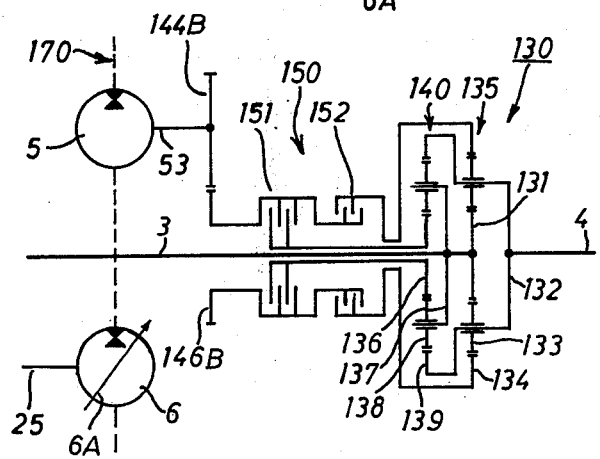

A second modification is disclosed in reference with FIG. 4, wherein the features are the construction and connection of a hydraulically operated clutch mechanism 150 which replaces the clutch mechanism 50, as seen in FIGS. 2 and 3. All other constructions and functions remain unchanged with the same reference numerals for the same component parts and portions.

The shaft 53 of the first pump-motor 5 is connected to the drum member of a high range clutch 151 and also to the hub member of a low range clutch 152 by way of a pair of gears 144B and 146B in mesh with each other. The sun gear 136 of the second planetary gear set 140 is in connection with the hub member of the high range clutch 151, and the ring gear 134 of the first planetary gear set 135 is connected to the drum member of the low range clutch 152.

With this second modification, a common variable speed-change ratio is obtainable in the low and high speed ratio ranges. All other operation features and procedures are the same as in the previous instances and no repetition is made. Consequently, in this second modification, the number of the gears can be reduced and the construction of the clutch mechanism can be simpler.

Figure 8:
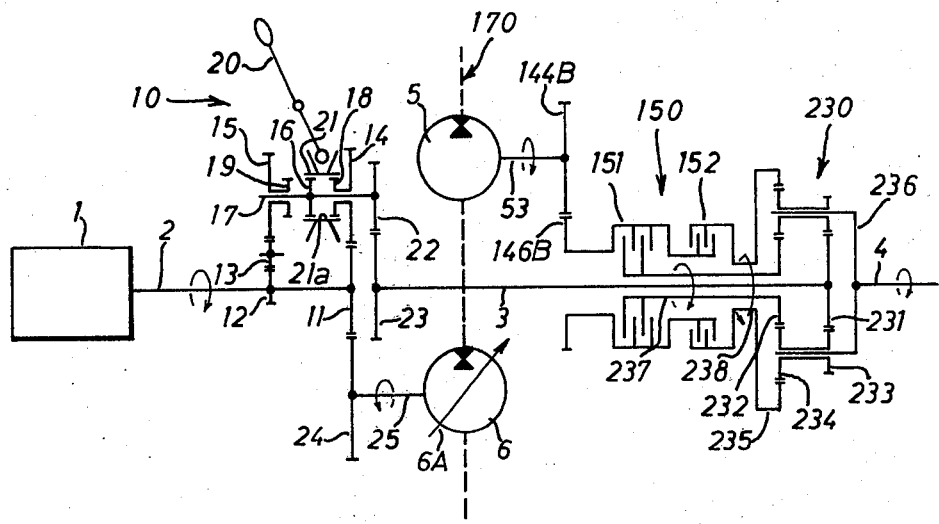
FIG. 8 shows a schematic skeleton of a third preferred embodiment of the hydrostatic transmission.

A third preferred embodiment of the hydrostatic transmission in accordance with the present invention is disclosed hereinafter particularly in reference with FIG. 8. This third embodiment includes in general the prime engine 1, the input, intermediate and output shafts 2, 3 and 4, the forward-reverse drive power train selector gear unit 10, the hydraulically operated clutch mechanism 150, the first and second pump-motors 5 and 6 including the closed hydraulic line circuit 170 therefor and a speed differential gear unit or planetary gear unit 230. The distinguished difference from the second embodiment is observed in the construction of the planetary gear unit 230. The constructions and functions of the selector gear unit 10, the clutch mechanism 150 and the pump-motors 5 and 6 are the same as those in the second preferred embodiment. Thus, the same reference numerals and characters indicate the same component parts and portions and eliminated are repetition of the explanations already made in the second embodiment.

In this third embodiment, the planetary gear unit 230 includes a first sun gear 231 connected to the intermediate shaft 3, a second sun gear 232 of which a shaft 237 is disposed in surrounding relationship to the intermediate shaft 3, and integral planet gears 233 and 234 respectively in mesh with the first and second sun gears 231 and 232. The planetary gear unit 230 further includes a ring gear 235 in mesh with the planet gear 234 and a carrier 236 which journals thereon the planet gears 233 and 234 and is connected to the output shaft 4.

The clutch mechanism 150 has the same construction as that of the second modification of the second preferred embodiment, as viewed in FIG. 4. The shaft 53 of the first pump-motor 5 is connected to the drum member of the high range clutch 151 and the hub member of the low range clutch 152 by way of a pair of gears 144B and 146B in mesh with each other. The second sun gear 232 of the planetary gear unit 230 is connected to the hub member of the high range clutch 151 through the shaft 237, and ring gear 235 is connected to the drum member of the low range clutch 152 through a shaft 238 disposed in surrounding relationship to the shaft 237. Thus, the first pump-motor 5 is conditioned always to its full displacement and the rotation speed of its shaft 53 is varied in accordance with the selection of the gear trains within the differential gear unit 230.

Figure 10:
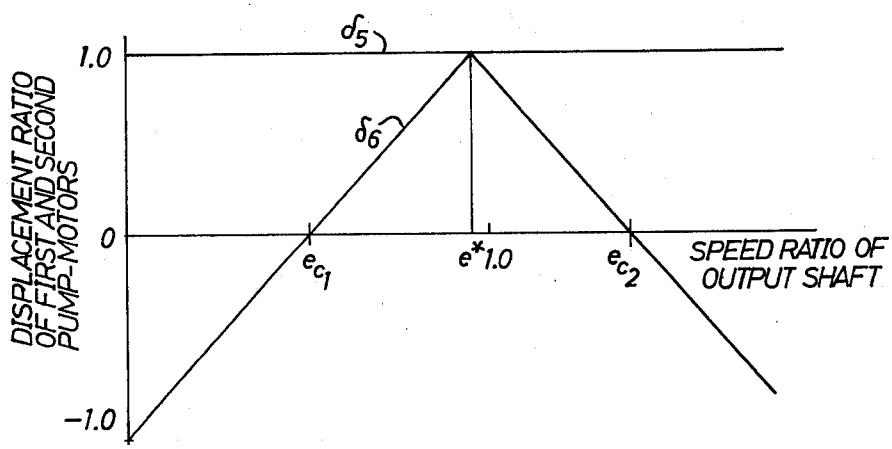
FIGS. 10, 11 and 12 are graphic charts showing certain operating characteristics of the third embodiment depicted in FIG. 8.
Figure 11:
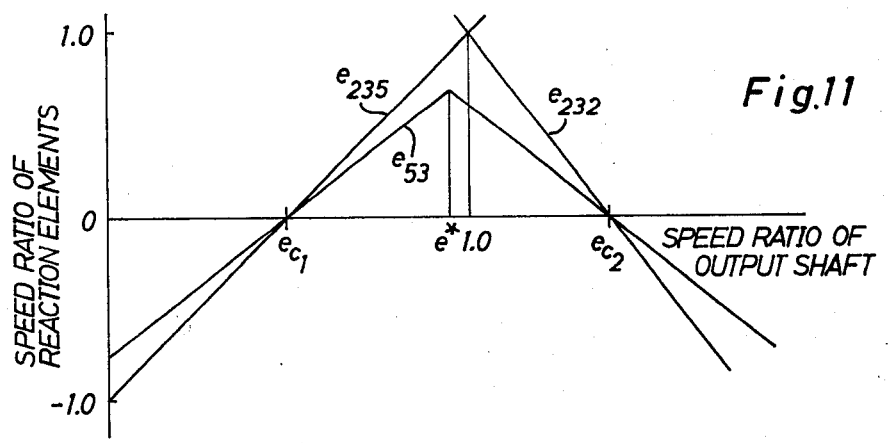

The operation of the above-disclosed transmission can well be explained in reference with FIGS. 10 and 11 illustrating characteristic lines. In FIG. 10, the axis of abscissa indicates the rotation speed ratio of the output shaft 4 against the rotation of the intermediate shaft 3 and the axis of ordinate indicates the displacement ratio of the pump-motors 5 and 6 against their full displacements; the displacements of the pump-motors 5 and 6 are respectively depicted by lines $\delta_5$ and $\delta_6$. In FIG. 11, lines $e_{53}$, $e_{232}$ and $e_{235}$ show respectively the rotation ratios of the shaft 53 of the first pump-motor 5, the second sun gear 232 and the ring gear 235 against the rotation of the intermediate shaft 3.

The selector gear unit 10 is positioned to its F condition for transmitting the clockwise rotation torque of the input shaft 2 to the intermediate shaft 3 which now makes its clockwise rotation. The low range clutch 152 is engaged to connect the shaft 53 of the first pump-motor 5 to the ring gear 235, which functions as a reaction element for the low speed gear train. While the displacement ratio $\delta_6$ of the second pump-motor 6 stays within the negative range, the transmission operates in its low speed ratio range. When the displacement ratio $\delta_6$ approaches to the zero value from its negative maximum value, the output shaft 4 is driven. In this instance, a portion of the torque given to the first sun gear 231 of the planetary gear unit 230 from the intermediate shaft 3 is transmitted to the shaft 53 of the first pump-motor 5 by way of the low range clutch 152. This operates the first pump-motor 5 as a pump and, in turn, the second pump-motor 6 as a motor. Thus, the torque in the form of hydraulic energy is returned to the intermediate shaft 3. Consequently, applied on the ring gear 235 is hydraulic reaction force, and on the other hand the remaining mechanical torque within the planetary gear unit 230 is transmitted to the output shaft 4.

In the low speed ratio range, in accordance with decreases of the displacement ratio $\delta_6$ in its absolute value from the maximum, the torque given to the pump-motors 5 and 6 in the form of hydraulic fluid pressure is decreased to minimize the speed ratios $e_{235}$ and $e_{53}$, which consequently causes continuous increase of the rotation speed of the output shaft 4. When the displacement ratio $\delta_6$ of the second pump-motor 6 turns to be zero, the first pump-motor 5 stops its pumping operation. This arrests the ring gear 235 and all the torque of the intermediate shaft 3 is mechanically conveyed to the output shaft 4. The speed ratio in this instance is called the first or low speed range standard speed ratio $e_{c1}$.

In a premise that, $\rho$ represents the gear ratio between the second sun gears 232 and the ring gear 235, $\rho_2$ represents the gear ratio between the second sun gear 232 and the planet gear 234, $\rho_1$ represents the gear ratio between the first sun gear 231 and the planet gear 233, $n_3$ shows the rotation speed of the intermediate shaft 3, $n_4$ shows the rotation speed of the output shaft 4, $n_{232}$ is for the rotation speed of the second sun gear 232, $n_{235}$ is for the rotation speed of the ring gear 235, and $n_p$ represents the rotation speed of the planet gears 233 and 234, the three following equalities are satisfied, $\rho_1 n_3 + n_p = (1 + \rho_1) n_4$
$\rho_2 n_{232} + n_p = (1 + \rho_2) n_4$
$\rho\ n_{232} + n_{235} = (1 + \rho) n_4$ And the standard speed ratio can be derived from $n_4/n_3$ when $n_{235} = 0$ in the above equalities. Thus, the standard speed ratio is represented by the following equality, $$e_{c1} = \rho \cdot \rho_1 / (\rho \cdot \rho_1 + \rho_2)$$

When the displacement ratio $\delta_6$ of the second pump-motor 6 is increased in its positive range, a portion of the torque from the input shaft 2 is transmitted to the second pump-motor 6 which, then, conducts its pumping operation. And, in turn, the first pump-motor 5 is conditioned to its motor operation. The hydraulic torque from the first pump-motor 5 is applied to the ring gear 235, thereby the rotation of the output shaft 4 is accelerated.

When the displacement ratio $\delta_6$ of the second pump-motor 6 reaches its maximum value, completed is a synchronized rotation between the drum and hub members of the high range clutch 151, the drum member being integrated with the ring gear 235 and the hub member being idly rotating with the second sun gear 232. The speed ratio at this instance is defined as the mode switch-over speed ratio $e$.

The transmission operation moves in its high speed ratio range from its low speed ratio range by way of disengagement of the low range clutch 152 and engagement of the high range clutch 151 at the mode switch-over speed ratio. In the variable changes of the speed ratio in the low speed ratio range, as well observed in FIG. 10, the displacement ratio $\delta_6$ of the second pump-motor 6 is varied in a range of $\pm 1$ and as well shown by the line $e_{53}$ in FIG. 11, the rotation speed of the shaft 53 of the first pump-motor 5 is set to be approximately the same at the zero speed ratio and at the mode switch-over speed ratio $e$. Thus, the mode switch-over speed ratio $e$ takes a value closer to 1.0 and the standard speed ratio $e_{c1}$ takes approximately a half value of the mode switch-over speed ratio $e$.

In the high speed ratio range, when the displacement ratio $\delta_6$ of the second pump-motor 6 is decreased, the first pump-motor 5 starts its pumping operation to subsequently let the second pump-motor 6 make its motor operation. Thus, hydraulic torque is reversed to the intermediate shaft 3. On the other hand, the shaft 53 of the first pump-motor 5 and the sun gear 232 of the planetary gear unit 230 are braked. Then, the torque given to the first sun gear 231 of the planetary gear unit 230 from the intermediate shaft 3 is continuously increased by means of the high speed ratio gear train and transmitted to the output shaft 4.

When the displacement ratio $\delta_6$ of the second pump-motor 6 turns zero, the first pump-motor 5 stops it pumping operation to arrest the rotation of the shaft 53. This arrests the second sun gear 232 and all the torque from the intermediate shaft 3 is mechanically transmitted to the output shaft 4. The speed ratio in this instance is called the second or high speed range standard speed ratio $e_{c2}$.

This second standard speed ratio $e_{c2}$ is represented by the following equality when $n_{232} = 0$ in the previous equalities, $$e_{c2} = \rho_1/(\rho_1 - \rho_2)$$

In increase of the absolute value of the displacement ratio $\delta_6$ in its negative range, the second pump-motor 6 conducts its pumping operation to drive the first pump-motor 5 so that the second sun gear 232 receives the hydraulic torque from the second pump-motor 6 to increase the speed ratio of the output shaft 4. Subsequently, the rotation of the output shaft 4 is further increased and will reach its maximum value when the displacement ratio $\delta_6$ becomes $-1$. The reverse procedures of the operation to increase the speed ratio as above-mentioned will decrease the speed ratio.

Figure 12:
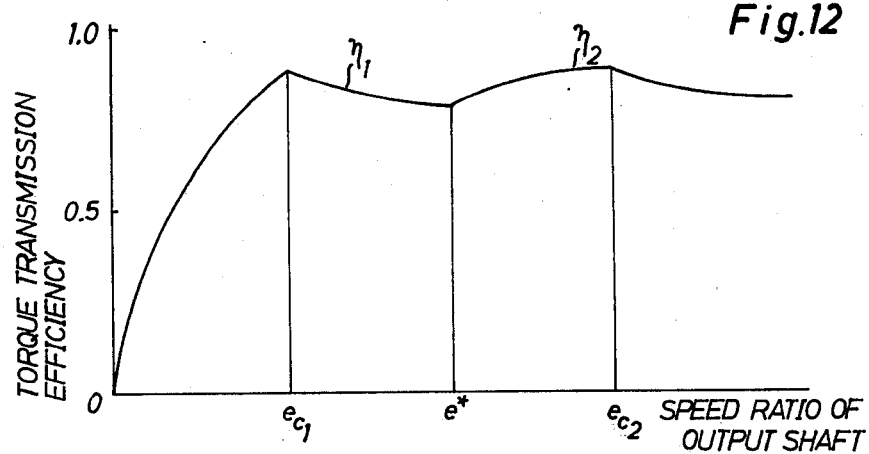

FIG. 12 indicates the torque transmission efficiency in the forward drive power train. In the figure, reference characters $\eta_1$ and $\eta_2$ represent respectively the efficiency in the low and high speed range operations. The total efficiency is obtainable in combination of the efficiencies $\eta_1$ and is $\eta_2$ and maintained at a high value since the mode switch-over speed ratio $e$ is set close to 1.0 and the interval is small between the first and second standard speed ratios $e_{c1}$ and $e_{c2}$ which show the best efficiency respectively in their speed ratio ranges.

The reverse drive power train is completed by shifting the selector lever 20 of the selector gear unit 10 to its R position, wherein the clockwise rotation torque of the input shaft 2 is transmitted to the intermediate shaft 3 as the counterclockwise rotation torque therefor. Then, the low range clutch 152 is engaged and the displacement ratio $\delta_6$ of the second pump-motor 6 is decreased from its maximum value in the positive displacement range. This enables the reverse drive of the output shaft 4 on the same variable speed ratio as in the forward drive.

When the selector lever 20 of the selector gear unit 10 is conditioned to its N position to block the torque transmission form the input shaft 2 to the intermediate shaft 3, realized is merely the circulation of operation fluid between the first and second pump-motors 5 and 6.

Figure 9:
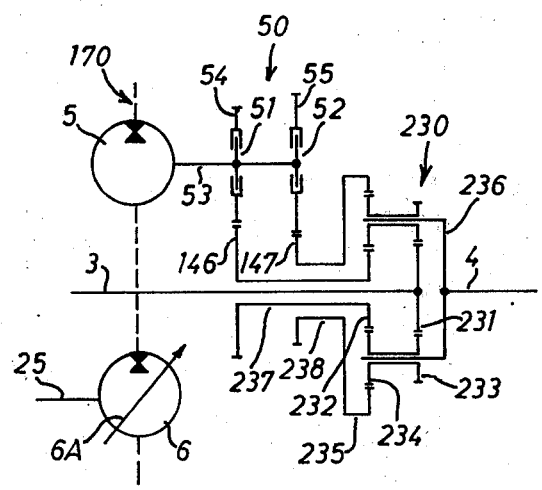
FIG. 9 depicts a partially schematic diagram of a modification of the third preferred embodiment.

A modification is disclosed in reference with FIG. 9, wherein the hydraulically operated clutch mechanism 150 in the third preferred embodiment is replaced with the same type of clutch mechanism as the one 50 adopted in the first preferred embodiment. All other constructions and functions remain the same as those in the third preferred embodiment with the same reference numerals for the same component parts and portions.

The clutch mechanism 50 in this instance is in such connection with the planetary gear unit 230 as described below. The gear 54 of the high range clutch 51 is in mesh with the gear 146 extended integrally from the second sun gear 232 and the gear 55 of the low range clutch 52 is in mesh with the gear 147 extended integrally from the ring gear 235. Thus, in changing the speed ratio ranges, the rotation of the shaft 53 is changed either by the gears 55 and 147 or the gears 54 and 146 to conduct synchronized engagment of the clutches 52 and 51.

With the transmission of the third preferred embodiment, the speed changes are conducted merely by a common ratio in the high and low speed ratio ranges and the mode switch-over speed ratio $e$ can only be determined at 1.0. The modified transmission can, however, take freely any speed change state and any mode switch-over speed ratio by selection of the gear ratios. This makes it more free to determine the numbers of teeth of the gears comprising the planetary gear unit 230. All other operation features and procedures are same as those in the third preferred embodiment and no repetition is made.

Figure 13:
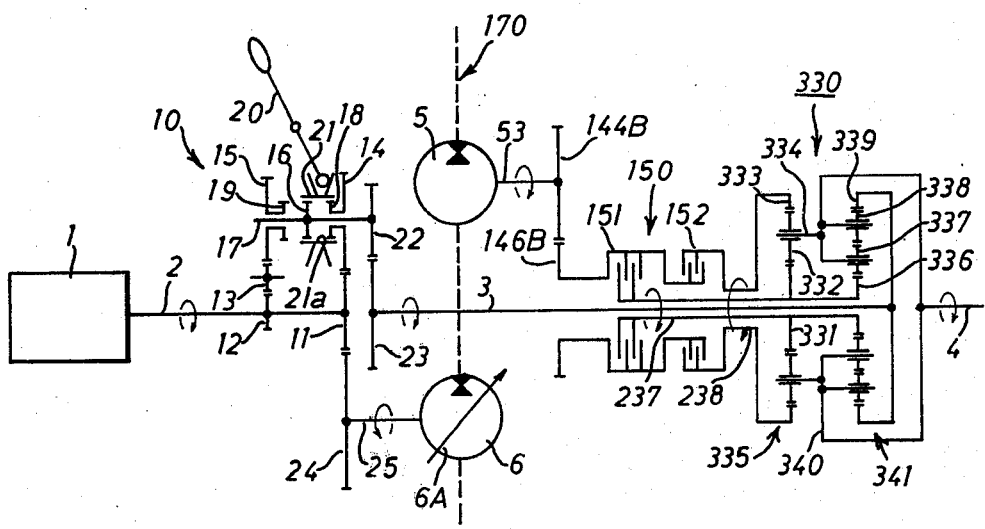
FIG. 13 is a partial schematic skeleton view illustrating a fourth preferred embodiment of the present invention.

FIG. 13 illustrates a fourth preferred embodiment of the transmission in accordance with the present invention. This fourth embodiment is mainly distinguished from the third embodiment by its differential gear unit 330. All other constructions and functions remain unchanged and the same reference numerals indicate the same component parts and portions.

The differential gear unit 330 includes generally a single planetary gear set 335 and a double planetary gear set 341. The single planetary gear set 335 includes a sun gear 331 fixed on the reaction shaft 237, a planet gear 332 in mesh with the sun gear 331, a ring gear 333 united with the reaction shaft 238 and a carrier 334 to journal the planet gear 332 thereon. The double planetary gear set 341 includes a sun gear 336 fixed on the reaction shaft 237, planet gears 337 and 338 in mesh with each other, a ring gear 339 united with the outer end of the intermediate shaft 3, and a carrier 340 to journal the planet gears 337 and 338 thereon. The carriers 334 and 340 are connected integrally on the output shaft 4. With this fourth embodiment, the differential torque transmission in the low and high speed ratio ranges are conducted by means of controlling the rotations of the reaction shafts 238 and 237 in respect with the gear ratios of the single and double planetary gear sets 335 and 341.

Figure 18:
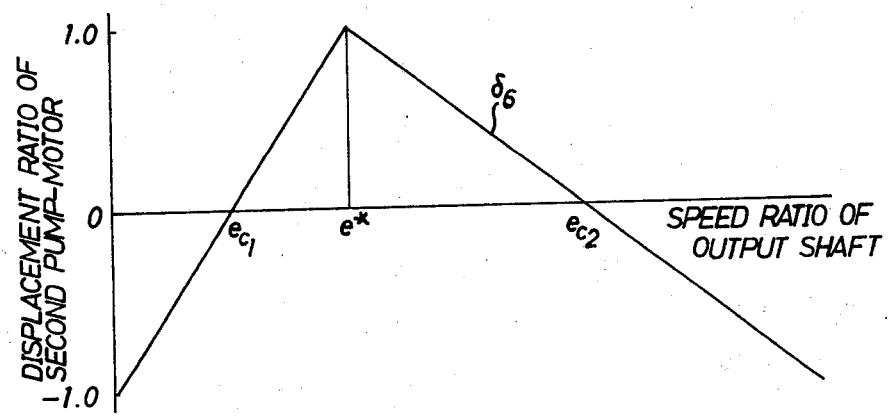
FIGS. 18 through 20 are graphic charts showing certain operating characteristics of the fourth embodiment viewed in FIG. 13.
Figure 19:
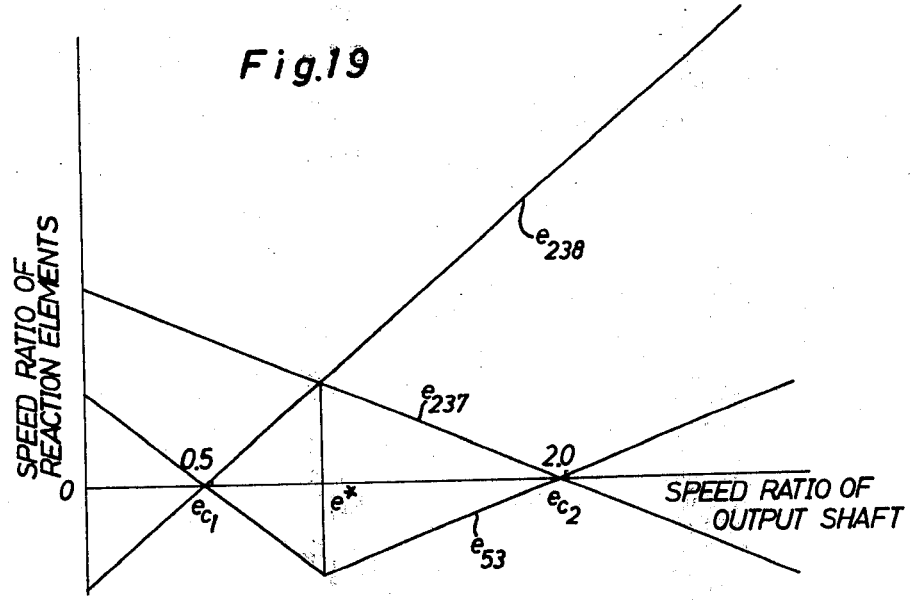

The operation of this fourth embodiment will be explained in reference with FIGS. 18 and 19 illustrating characteristic lines. In FIG. 18, the axis of abscissa indicates the rotation speed ratio of the output shaft 4 against the rotation of the intermediate shaft 3 and the axis of ordinate indicates the displacement ratio of the second pump-motor 6 against its full displacement; the displacement of the pump-motor 6 is depicted by a line $\delta_6$. In FIG. 19, lines $e_{53}$, $e_{238}$ and $e_{237}$ show respectively the rotation ratios of the shaft 53 of the first pump-motor 5 and the reaction shafts 238 and 237 against the rotation of the intermediate shaft 3.

When the selector gear unit 10 is positioned to its F condition for transmitting the clockwise rotation torque of the input shaft 2 to the intermediate shaft 3 which now makes its clockwise rotation, the low range clutch 152 is engaged prior to the shifting of the selector gear unit 10 to connect the shaft 53 of the first pump-motor 5 to the ring gear 333 through the reaction shaft 238, which functions as a reaction element for the low speed gear train. While the displacement ratio $\delta_6$ of the second pump-motor 6 stays within the negative area, the transmission operates in its low speed ratio range. When the displacement ratio $\delta_6$ approaches the zero value from its negative maximum value, the output shaft 4 is driven. In this instance, a portion of the torque given to the ring gear 339 of the double planetary gear unit 341 from the intermediate shaft 3 is transmitted to the shaft 53 of the first pump-motor 5 by way of the planet gears 337 and 338, the carriers 340 and 334, the planet gear 332, the ring gear 333, the reaction shaft 238 and the low range clutch 152. This operates the first pump-motor 5 as a pump and, in turn, the second pump-motor 6 as a motor. Thus, the torque in the form of hydraulic energy is returned to the intermediate shaft 3. Consequently, applied on the ring gear 333 is hydraulic reaction force, and on the other hand the remaining mechanical torque within the double planetary gear unit 341 is transmitted to the output shaft 4. In the low speed gear train, the ring gear 333 rotates counterclockwise and the sun gears 331 and 336 rotate clockwise.

In the low speed ratio range, in accordance with decreases of the displacement ratio $\delta_6$ in its absolute value from the maximum, the torque given to the pump-motors 5 and 6 in the form of hydraulic fluid pressure is decreased to minimize the speed ratios $e_{238}$ and $e_{53}$ as seen in FIG. 19, which consequently causes continuous increase of the rotation speed of the output shaft 4. When the displacement ratio $\delta_6$ of the second pump-motor 6 turns to zero, as seen in FIG. 18, the first pump-motor 5 stops its pumping operation. This arrests the ring gear 333 and all the torque of the intermediate shaft 3 is mechanically conveyed to the output shaft 4. The speed ratio in this instance is called the first or low speed range standard speed ratio $e_{c1}$. In this instance, the following equalities are satisfied, $$\rho_1 n_{237} + n_{238} = (1 + \rho_1) n_4$$

$$-\rho_2 n_{237} + n_3 = (1 - \rho_2) n_4$$

under the definition:
$\rho_1$ indicates the gear ratio between the sun gear 331 and the ring gear 333 of the single planetary gear set 335,
$\rho_2$ represents the gear ratio between the sun gear 336 and the ring gear 339 of the double planetary gear set 341, and $n_3$, $n_4$, $n_{237}$ and $n_{238}$ are respectively for the rotation speeds of the intermediate shaft 3, the output shaft 4, and the reaction shafts 237 and 238.

The first standard speed ratio $e_{c1}$ is, therefore, obtained in the following equality through $n_4/n_c$ in a premise that $n_{238} = 0$.

$$e_{c1} = \rho_1/(=_1 + \rho_2)$$

When the displacement ratio $\delta_6$ of the second pump-motor 6 is increased in its positive area, a portion of the torque from the input shaft 2 is transmitted to the second pump-motor 6 which, then, conducts its pumping operation. And, in turn, the first pump-motor 5 is conditioned to its motor operation. This motor operation of the first pump-motor 5 rotates the shaft 53 counter-clockwise and the reaction shaft 238 clockwise. Thus, the hydraulic torque given from the first pump-motor 5 is applied to the ring gear 333 through the reaction shaft 238 as a clockwise rotation torque, thereby the rotation of the output shaft 4 is accelerated.

When the displacement ratio $\delta_6$ of the second pump-motor 6 reaches its maximum value, completed is a synchronized rotation between the drum and the hub members of the high range clutch 151, the drum member being united with the gear 146B and the hub member being united with the reaction shaft 237 having the sun gears 331 and 336. The speed ratio at this instance is defined as the mode switch-over speed ratio $e$. The transmission operation moves in its high speed ratio range from its low speed ratio range by way of disengagement of the low range clutch 152 and engagement of the high range clutch 151 at the mode switch-over speed ratio.

In the high speed ratio range, when the displacement ratio $\delta_6$ of the second pump-motor 6 is decreased, the first pump-motor 5 starts its pumping operation to subsequentially let the second pump-motor 6 make its motor operation. Thus, hydraulic torque is reversed to the intermediate shaft 3. Meanwhile, the shaft 53 of the first pump-motor 5 and the sun gears 331 and 336 fixed on the reaction shaft 237 are braked. Then, the torque given to the ring gear 339 of the double planetary gear unit 341 from the intermediate shaft 3 is continuously increased by means of the reaction force exerted on the sun gears 331 and 336 and transmitted to the output shaft 4.

When the displacement ratio $\delta_6$ of the second pump-motor 6 turns zero, the first pump-motor 5 stops its pumping operation to arrest the rotation of the shaft 53. This arrests the sun gears 331 and 336 and all the torque from the intermediate shaft 3 is mechanically transmitted to the output shaft 4. The speed ratio in this instance is called the second or high speed range standard speed ratio $e_{c2}$. This second standard speed ratio $e_{c2}$ is represented by the following equality when $n_{237} = 0$ in the previous equalities.

$$e_{c2} = 1/(1 - \rho_2)$$

In increase of the absolute value of the displacement ratio $\delta_6$ in its negative area, the second pump-motor 6 conducts its pumping operation to drive the first pump-motor 5 as a motor so that the sun gears 331 and 336 are driven counter-clockwise and the hydraulic torque from the second pump-motor 6 increases the speed ratio of the output shaft 4 by means of the function of the double planetary gear unit 341. Subsequently, the rotation ratio of the output shaft 4 is further increased and will reach its maximum value when the displacement ratio $\delta_6$ becomes $-1$. The reverse procedures of the operation to increase the speed ratio as above-mentioned will decrease the speed ratio.

With this fourth embodiment, a common variable drive ratio is obtained in the low and high speed ratio ranges, the mode switch-over speed ratio $e$ being fixed closer at a value of 1.0. As shown in FIG. 19, assuming that the low and high standard speed ratios $e_{c1}$ and $e_{c2}$ are respectively represented by values of 0.5 and 2.0, the rotation speed of the shaft 53 of the first pump-motor 5 is controlled to be equal and maximum when the speed ratios of the output shaft 4 are respectively indicated by the values of zero, e and maximum.

Figure 20:
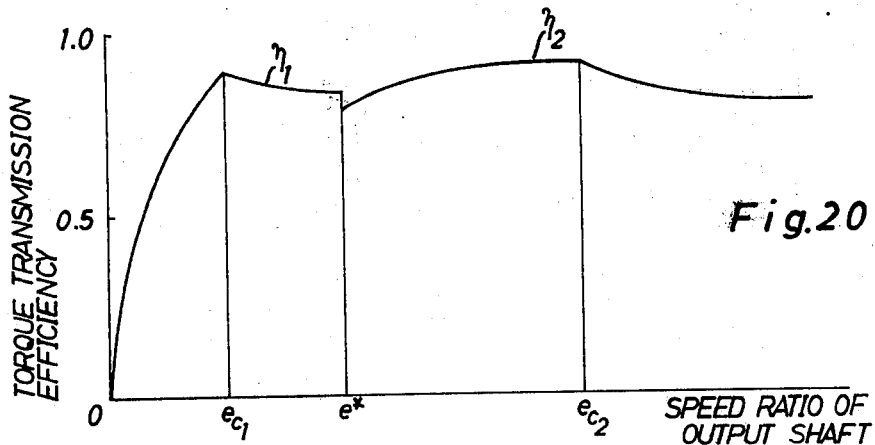

FIG. 20 indicates the torque transmission efficiency in the mentioned forward drive power train. In the figure, reference characters $\eta_1$ and $\eta_2$ represent respectively the efficiency in the low and high speed ratio range operations. The efficiencies $\eta_1$ and $\eta_2$ rise up in accordance with the increase of the each speed ratio and reach their maximum values respectively at the first and second standard speed ratios $e_{c1}$ and $e_{c2}$.

The remaining operation features and procedures remain unchanged as in the third preferred embodiment and no repetition is made hereinafter.

Figure 14:
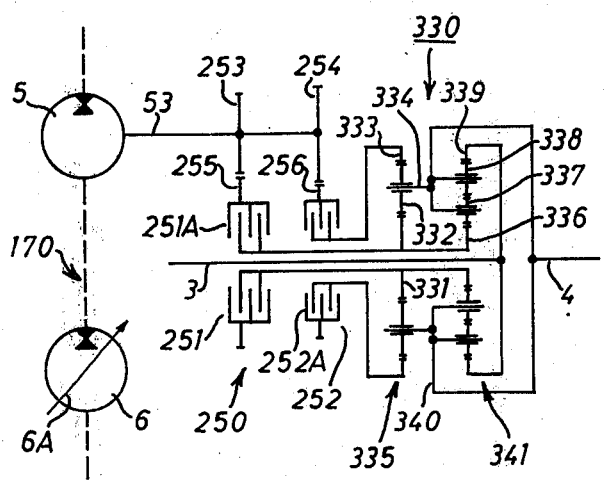
FIGS. 14 through 17 illustrate respectively partial skeleton diagrams of the modifications of the fourth preferred embodiment shown in FIG. 13.

A first modification of the fourth preferred embodiment is disclosed in reference with FIG. 14, wherein the constructional feature is the connection of a hydraulically operated clutch mechanism 250 to the first pump-motor 5. In this clutch mechanism 250, gears 253 and 254 are integrally secured on the shaft 53 of the first pump-motor 5 and are in mesh respectively with gears 255 and 256 which are respectively provided on the drum member 251A of a high range clutch 251 and the drum member 252A of a low range clutch 252. Thus, at the speed ratio range change-overs, the clutches 251 and 252 may be synchronized by way of the combinations of the gears 253 and 255 or the gears 254 and 256. And the speed changes and the mode switch-over ratio of this transmission can be determined as desired by means of proper selection of gear ratios between the gears 253 and 255 or the gears 254 and 256. Furthermore, the gear ratios within the differential gear unit 330 is given more free-selections.

Disclosed furthermore hereinafter are second, third and fourth modifications of the fourth preferred embodiment. All the second to fourth modifications are featured with different arrangements and functions of their differential gear units 330A, 330B and 330C. Commonly in these three modifications, the constructions and functions except the differential gear unit 330A, 330B or 330C remain unchanged as those in the fourth preferred embodiment with the same reference numerals for the same component parts and portions.

Figure 15:
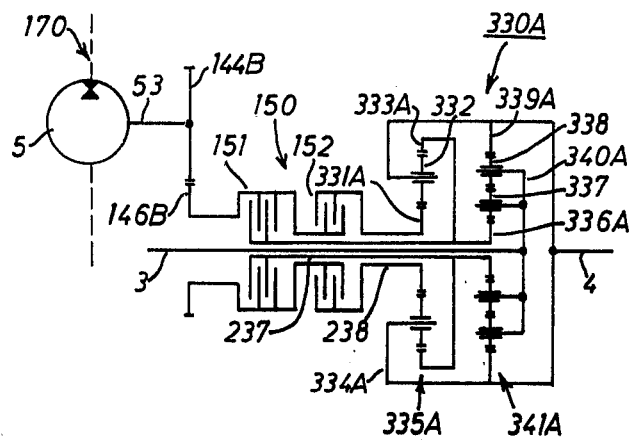

Now in the second modification in reference with FIG. 15, a ring gear 333A and a sun gear 336A are fixed on the reaction shaft 237, and a sun gear 331A is connected with the reaction shaft 238. A carrier 340A is connected with the intermediate shaft 3 and a carrier 334A and a ring gear 339A are integrally secured on the output shaft 4. The mentioned new arrangements within the differential gear unit 330A define the first and second standard speed ratios $e_{c1}$ and $e_{c2}$ as shown below.

$e_{c1} = 1 - \rho_2$ and
$e_{c2} = (1 - \rho_2)/(1 - \rho_2 - \rho_1\rho_2)$

Figure 16:
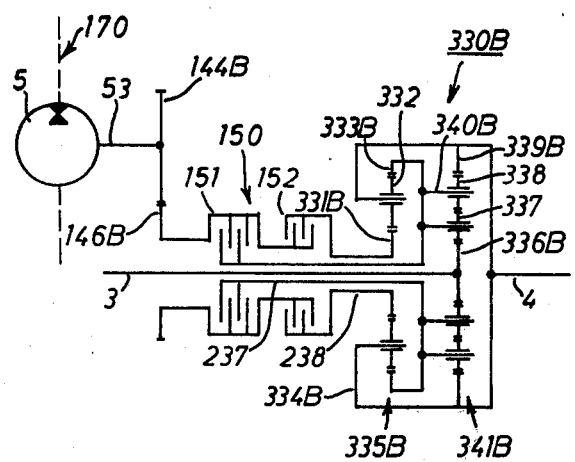

In the third modification in reference with FIG. 16, a sun gear 336B is integrally secured on the outer end of the intermediate shaft 3 and the sun gear 331B on the outer end of the reaction shaft 238. A carrier 340B and a ring gear 333B are integrally connected to the reaction shaft 237 and a carrier 334B and a ring gear 339B to the output shaft 4. Thus, the first and second standard speed ratios $e_{c1}$ an $e_{c2}$ are represented by the following equalities:

$e_{c1} = \rho_2$ and
$e_{c2} = \rho_2/(\rho_2 + \rho_1\rho_2 - \rho_1)$

Figure 17:
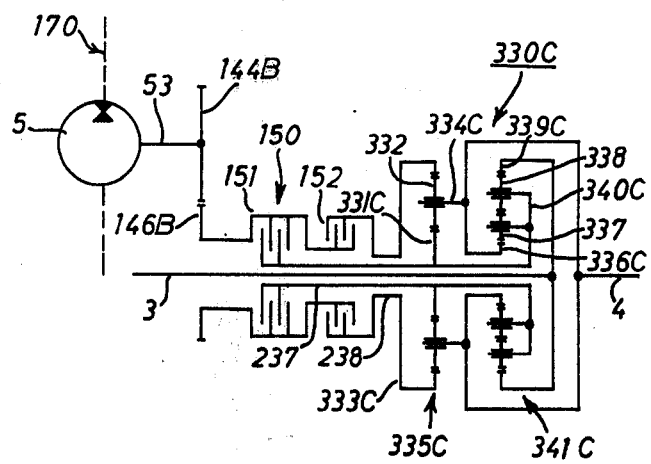

In the fourth modification in reference with FIG. 17, ring gears 339C and 333C are respectively connected to the intermediate and reaction shafts 3 and 238. A sun gear 331C and a carrier 340C are intergral with the reaction shaft 237. A carrier 334C and a sun gear 336C are connected to the output shaft 4. With this modification, the first and second standard speed ratios $e_{c1}$ and $e_{c2}$ are represented as follows:

$e_{c1} = \rho_1/(\rho_1 + 1 - \rho_2)$ and
$e_{c2} = 1/\rho_2$

Moreover, these modifications may take the connecting construction for the clutch mechanism 250, as shown in FIG. 14, in replacement of the clutch mechanism 150 disclosed in the corresponding figures.

Figure 21:
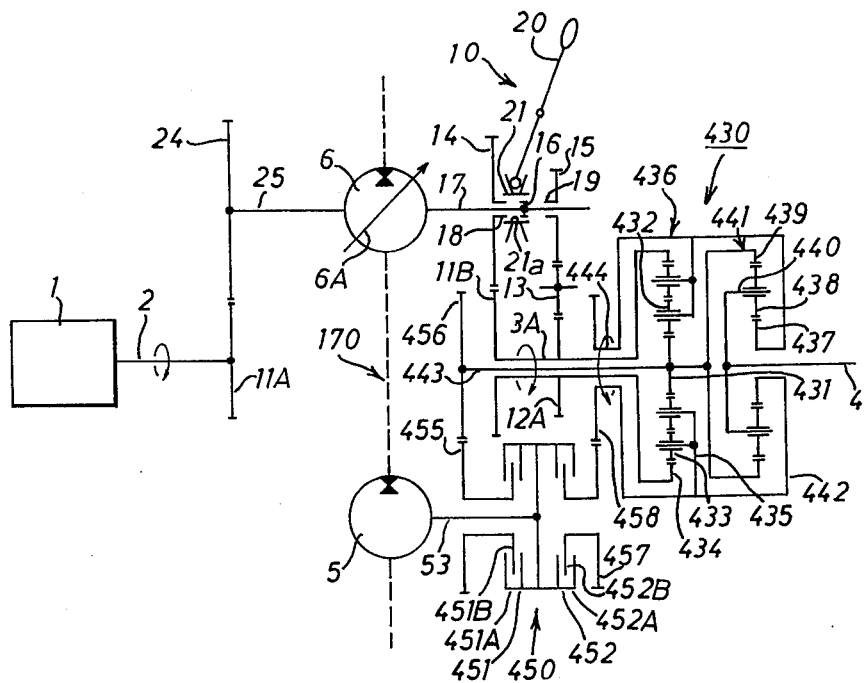
FIG. 21 is a schematic skeleton view of a fifth embodiment of the present invention.

A fifth preferred embodiment of the transmission, in accordance with the present invention, is disclosed hereinafter particularly in reference with FIG. 21. This fifth embodiment includes in general the prime engine 1, the input, intermediate and output shafts 2, 3A and 4, the forward-reverse drive power train selector gear unit 10, a hydraulically operated clutch mechanism 450, the first and second pump-motors 5 and 6 including the closed hydraulic line circuit 170 therefor and a differential gear unit or planetary gear unit 430. The distinguished differences from the previous embodiments are observed in the arrangement of the component devices and parts and also in the constructions of the clutch mechanism 450 and the planetary gear unit 430.

The constructions and functions of the selector gear unit 10, and the pump-motors 5 and 6 are the same as those in the previous preferred embodiments. Thus, the same reference numerals and characters indicate the same component parts and portions nd eliminated are repetition of the explanations already made in the previous embodiments.

In the fifth embodiment, the arrangement of the component devices and parts is such that the input shaft 2 is connected to the shaft 25 of the second pump-motor 6 by way of a pair of meshing gears 11A and 24. The shaft 25 is connected to the counter shaft 17 of the selector gear unit 10. Gears 11B and 12A are secured on the intermediate shaft 3A in this particular embodiment. Thus, the power train is completed in sequence of the prime engine 1, the input shaft 2, the gears 11A and 24, the second pump-motor 6 in respect with the first pump-motor 5, the selector gear unit 10, the intermediate shaft 3A, the differential gear unit 430 including the clutch mechanism 450, and the output shaft 4.

The differential or planetary gear unit 430 comprises a double planetary gear set 435 and a single planetary gear set 441. The double planetary gear set 435 includes a sun gear 431, planet gears 432 and 433, a ring gear 434 and a carrier 435 integrally journalling the planet gears 432 and 433. The single planetary gear set 441 includes a sun gear 437, a planet gear 438, a ring gear 439 and a carrier 440 journalling the planet gear 438. The ring gear 434 of the double planetary gear set 436 is connected to the intermediate shaft 3A. The carrier 435 is connected to the sun gear 437 of the single planetary gear set 441 by way of a rotary member 442. The carrier 440 is connected to the output shaft 4.

A first reaction shaft 443 is disposed within the tubular intermediate shaft 3A and has the sun gear 431 and the ring gear 439 united thereon at its outer portion. A second reaction shaft 44 is disposed in the surrounding relationship to the intermediate shaft 3A and connected to the rotary member 442. Thus, low and high speed gear ratios are obtained by regulating the rotations of the first and second reaction shafts 443 and 444 in respect with the gear ratios of the double and single planetary gear sets 436 and 441.

The clutch mechanism 450 comprises a low range clutch 451 and a high range clutch 452. Drum members 451A and 452A of the clutches 451 and 452 are connected to the shaft 53 of the first pump-motor 5. Meanwhile, a hub member 451B of the low range clutch 451 is connected to the first reaction shaft 443 by way of a pair of meshing gears 455 and 456, and a hub member 452B of the high range clutch 452 to the second reaction shaft 444 by way of a pair of meshing gears 457 and 458. Engagement of these clutches 451 and 452 complete low and high speed drive power trains in respect with the low and high speed gear trains of the differential gear unit 430.

Figure 22:
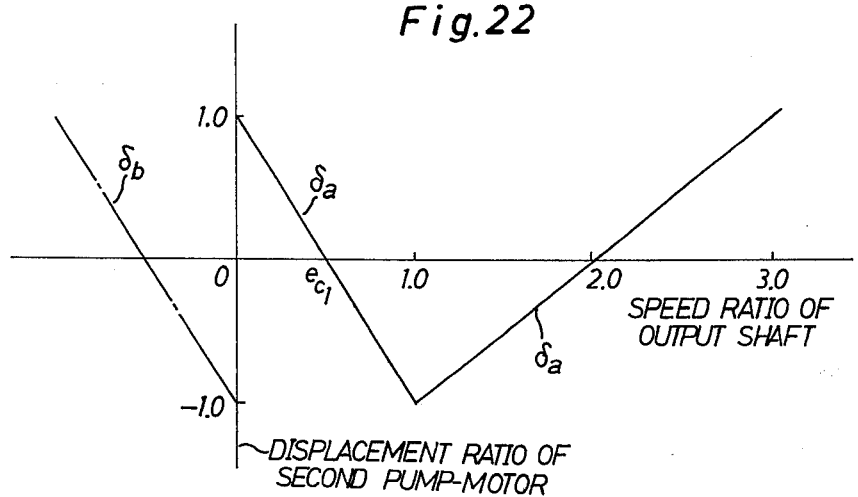
FIGS. 22 and 23 are graphic charts showing certain operating characteristics of the fifth embodiment.
Figure 23:
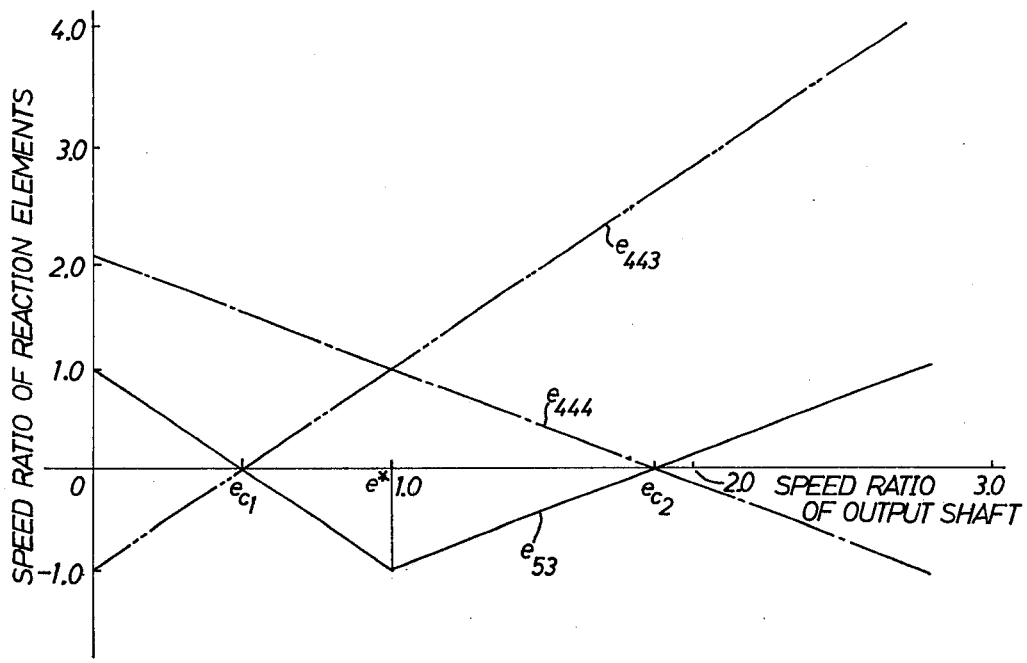

The operation of the above-disclosed transmission can well be explained in reference with FIGS. 22 and 23 illustrating characteristic lines. In FIG. 22, the axis of abscissa indicates the rotation speed ratio of the output shaft 4 against the rotation of the intermediate shaft 3A and the axis of ordinate indicates the fluid displacement ratios of the second pump-motor 6 against the maximum displacements in the forward and reverse drive power trains; the displacements in the forward and reverse drive power trains are respectively represented by line $\delta_a$ and $\delta_b$. In FIG. 23, lines $e_{443}$, $e_{444}$ and $e_{53}$ show respectively the rotation ratios of the first and second reaction shafts 443 and 444 and the shaft 53 of the first pump-motor 5 against the rotation of the intermediate shaft 3A.

When the selector lever 20 of the selector gear unit 10 is conditioned to its N position to block the torque transmission from the input shaft 2 to the intermediate shaft 3A, realized is merely the circulation of operation fluid between the first and second pump-motors 5 and 6, the rotation of the input shaft 2 activating the second pump-motor 6. Thus, no hydraulic pressure is produced to create reaction force within the differential gear unit 430 and the neutral condition of the transmission is maintained.

While the neutral drive power train is maintained, activation of the prime engine 1 with the full displacement capacity of the second pump-motor 6 conditioned to its positive direction rotates the shaft 25 of the second pump-motor 6 and the counter shaft 17 and the outer spline 16 of the selector gear unit 10. At the same time, the pumping action of the second pump-motor 6 causes the motor action of the first pump-motor 5. Within the planetary gear unit 430, the carrier 440, which is integral with the output shaft 4, is locked until the vehicle starts, and consequently the rotation torque transmitted to the first reaction shaft 443 from the shaft 53 of the first pump-motor 5 acts to rotate the gear 14 and the spline 18 of the selector gear unit 10 by way of the gear 11B of the intermediate shaft 3A upon the engagement of the low range clutch 451, the gear 11B being united with the ring gear 434 of the double planetary gear set 436. Proper selection of gear ratio for the gears 14 and 11B enables synchronization between the spline 16 and 18 for smooth shifting operation. The above is the synchronization for completing the foward drive power gear train but the same theory can be applied for the synchronization for completing the reverse drive power gear train for which proper selection of gear ratio for the gears 12A and 15 becomes necessary.

To complete the forward drive power train of the transmission, thte selector gear unit 10 is conditioned to its "F" position for connecting the shaft 25 of the second pump-motor 6 to the intermediate shaft 3A through the forward drive power train of the selector gear unit 10, and, in turn, the low range clutch 451 is engaged to connect the shaft 53 of the first pump-motor 5 to the first reaction shaft 443 through the pair of meshing gears 455 and 456. Under the mentioned state, while thee displacement ratio $\delta_a$ of the second pump-motor 6 stays within the positive area, the transmission operates in its low speed ratio range. When the displacement ratio $\delta_a$ is at its positive maximum and the prime engine 1 is activated, the vehicle starts.

In the low speed ratio range, in accordance with decreases of the displacement ratio $\delta_a$ in its absolute value from the maximum, the hydraulic fluid pressure from the first pump-motor 5 is decreased to minimize the speed ratio $e_{53}$ of the shaft 53 of the first pump-motor 5, which consequently causes continuous increase of the rotation speed of the output shaft 4. When the displacement ratio $\delta_a$ of the second pump-motor 6 turns to zero, the first pump-motor 5 stops its pumping operation. This arrests the sun gear 431 and the ring gear 439 which are united with the first reaction shaft 443 and all the torque of the intermediate shaft 3A is mechanically transmitted to the output shaft 4 by way of the output gear train including the intermediate shaft 3A, the double planet gears 432 and 433, the carrier 435, the rotary member 442, the sun gear 437, the single planet gear 438 and the carrier 440. The speed ratio in this instance is called hereinafter the first or low speed standard speed ratio $e_{c1}$.

Within the speed change range of the output shaft 4 from zero to the first standard speed ratio $e_{c1}$, a portion of the torque transmitted from the intermediate shaft 3A to the ring gear 434 of the double planetary gear set 436 is conveyed to the shaft 53 of the first pump-motor 5 by way of the first reaction shaft 443 united with the sun gear 431 making its counter-clockwise rotation, the gears 455 and 456, and the low range clutch 451. This causes the pumping action of the first pump-motor 5, so that the second pump-motor 6 conducts its motor operation to feed back the hydraulic torque to the intermediate shaft 3A.

Through the above-mentioned operation, a reaction force is produced on the sun gear 431 and the ring gear 439 within the planetary gear unit 430. And the remaining torque of the ring gear 434 is mechanically applied to the output shaft 4 by way of a low speed gear train including the planet gears 432 and 433, the carrier 435, the rotary member 442, the sun gear 437, the planet gear 438 and the carrier 440 of the single planetary gear set 441. Thus, while the sun gear 437 keeps its clockwise rotation, the rotation speed ratio $e_{443}$ of the first reaction shaft 443 approaches zero as well observed in FIG. 23, which makes automatically the rotation speed ratio of the ring gear 439 zero as the gear 439 is united with the first reaction shaft 443. Consequently, the rotation of the output shaft 4 is continuously acceralated.

In the premise that the following characters represent the corresponding factors, $\rho_1$————Gear ratio between the sun gear 431 and the ring gear 434 of the double planetary gear set 436, $\rho_2$————Gear ratio between the sun gear 437 and the ring gear 439 of the single planetary gear set 441, and $n_3$, $n_4$, $n_{443}$ and $n_{444}$ ————

Respectively the rotation speeds of the intermediate shaft 3A, the output shaft 4, the first reaction shaft 443 and the second reaction shaft 444, the following two equalities are satisfied, $$-p_1 n_{443} + n_3 = (1 - p_1) n_{444}$$
$$p_2 n_{444} + n_{443} = (1 + p_2) n_4$$

In the above-equalities, the first standard speed ratio $e_{c1}$ is obtainable from $n_4/n_3$ when $n_{443}$ becomes zero;

$$e_{c1} = p_2(1 - p_1)(1 + p_2)$$

In the case that $p_1$ and $p_2$ are defined with values within a practical range, $e_{c1}$ may be represented by 0.5 approximately.

Now, when the displacement capacity of the second pump-motor 6 is increased from the zero value in its absolute value in the negative area, the second pump-motor 6 is driven for its pumping action by a portion of the torque transmitted from the input shaft 2 to the shaft 25 by way of the gears 11A and 24. In turn, the first pump-motor 5 conducts its motor operation. The hydraulic pressure is thus converted into a mechanical torque by the first pump-motor 5. This mechanical torque is transmitted from the shaft 53 of the first pump-motor 5 to the sun gear 431 and the ring gear 439 by way of the low range clutch 451, the gears 455 and 456 and the first reaction shaft 443. As readable in FIG. 23, the rotations of the sun gear 431 and the ring gear 439 are accerelated. Meanwhile, the remaining torque of the shaft 25 of the second pump-motor 6 is applied to the planetary gear unit 430 by way of the intermediate shaft 3A in the same procedures as described previously. Consequently, the rotation of the output shaft 4 is further continuously accerelated.

When the displacement ratio $\delta_a$ of the second pump-motor 6 reaches its maximum absolute value, the rotations of the drum member 452A of the high range clutch 452 rotating together with the low range clutch 451 and the hub member 452B which has idly been rotating are synchronized in respect with the gear ratio between the gears 457 and 458 to represent the mode switch-over speed ratio $e^*$. The transmission operation moves in its high speed ratio range from its low speed ratio range by means of disengagement of the low range clutch 451 and engagement of the high range clutch 452 at the mode switch-over speed ratio $e$.

In the above mentioned changes of the speed ratio in the low speed ratio range, wherein the displacement ratio $\delta_a$ of the second pump-motor 6 is varied in a range of $\pm 1$, the mode switch-over speed ratio $e$ takes a value of 1.0, and the first standard speed ratio $e_{c1}$ takes an approximate value of 0.5. This means, as well observed in FIG. 23, that the rotation speed of the shaft 53 of the first pump-motor 5 takes a same absolute value at the mode switch-over speed ratio $e$ and at the zero value of the rotation speed ratio of the output shaft 4.

In the high speed ratio range, the first pump-motor 5 starts its pumping operation to cause the motor operation of the second pump-motor 6. Thus, hydraulic torque is reversed to the intermediate shaft 3A. When the displacement ratio $\delta_a$ of the second pump-motor 6 approaches zero in its absolute value in the negative area, the first pump-motor 5 decreases its hydraulical discharge to slow down the rotation of the shaft 53. This brakes the rotation of the second reaction shaft 444 which is now connected to the shaft 53 by way of the high range clutch 452. In this instance, the torque from the intermediate shaft 3A is applied to the ring gear 434 of the double planetary gear set 436. Meanwhile decelerated is the rotation of the reaction gearing including the carrier 435 and the sun gear 437 which are united with the second reaction shaft 444 and in connection with the shaft 53 of the first pump-motor 5. This deceleration accelerates the rotation of a high speed gear train including the intermediate shaft 3A, the ring gear 434, the double planet gears 432 and 433, the sun gear 431 and the ring gear 439 which are united with the first reaction shaft 443. Thus, the rotation of the output shaft 4 is continuously increased from the mode switch-over speed ratio $e$ by means of the high speed gear train.

When the displacement ratio $\delta_a$ of the second pump-motor 6 turns zero, in its absolute value in the negative area, the first pump-motor 5 stops its discharging to arrest the rotation of the shaft 53. This arrests the rotations of the reaction gearing and all the torque from the intermediate shaft 3A is mechanically transmitted to the output shaft 4 by way of the high speed gear train. The speed ratio in this instance is called the second or high speed standard speed ratio $e_{c2}$.

The value of this second standard speed ratio $e_{c2}$ may be obtained through the previous equalities for the first standard speed ratio $e_{c1}$. In this case, a definition of $n_{444} = 0$ is made and an equality, $$e_{c2} = 1/p_1(1 + p_2)$$

should be satisfied. The result value will be 2.0 provided the practical values should be selected for $p_1$ and $p_2$.

By increase of the displacement ratio $\delta_a$ in its positive area, the second pump-motor 6 conducts its pumping operation to drive the first pump-motor 5 as a motor so that the shaft 53 makes its clockwise rotation to cause counterclockwise rotation of the reaction gearing. Thus, the hydraulic torque is conveyed to the output shaft 4. Meanwhile, the remaining torque after the second pump-motor 6 as a pump is driven is transmitted to the output shaft 4 by way of the high speed gear train. Subsequently, the rotation ratio of the output shaft 4 is further increased and will reach its maximum value when the displacement ratio $\delta_a$ of the second pump-motor 6 reaches its maximum. And the rotation speed of the shaft 53 of the first pump-motor 5 takes its maximum value which is equal to the case when the rotation speed of the output shaft 4 becomes zero as observed in FIG. 23.

The reverse procedures of the operation to increase the speed ratio as described heretofore will decrease the speed ratio.

For the reverse drive operation, the displacement $\delta_b$ of the second pump-motor 6 is increased to its maximum value in the negative area to rotate the shaft 53 of the first pump-motor 5 in the reverse direction to the forward drive operation. At the same time, the low range clutch 451 is engaged to connect the shaft 53 to the first reaction shaft 443 for the low speed gear ratio. Consequently, while the selector gear unit 10 is conditioned to its N position, the intermediate shaft 3A makes its rotation reversely to the case of the forward drive operation by the torque given to the first reaction shaft 443 from the first pump-motor 5. The idler gear 13 of the selector gear unit 10 adjusts the gear 15 to rotate in the same direction as the shaft 25 of the second pump-motor 6 to enable the synchoronous shifting of the selector gear unit 10.

The reverse drive power train is completed by synchronously shifting the selector lever 20 of the selector gear unit 10 to its R position. And the output shaft 4 starts its reverse rotation.

Figure 24:
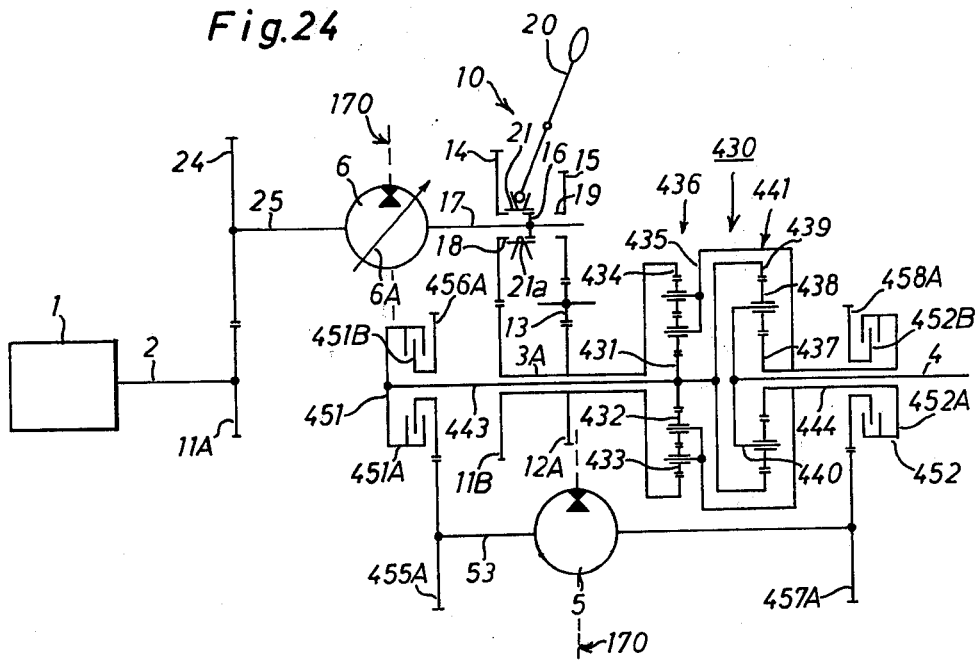
FIGS. 24 through 26 are skeleton views illustrating the modifications of the fifth preferred embodiment.

A first modification of the fifth preferred embodiment is disclosed in reference with FIG. 24, wherein the features are the arrangement and connection of the low and high range clutches 451 and 452 and the position of the second reaction shaft 444. All other constructions and functions remain unchanged with the same reference numerals for the same component parts and portions.

In this modification, the drum 451A of the low range clutch 451 for the low speed gear train is connected to the first reaction shaft 443 and the hub member 451B to the shaft 53 of the first pump-motor 5 by way of a pair of meshing gear 455A and 456A.

The second reaction shaft 444 is aligned coaxially with the output shaft 4 and is connected integrally with the carrier 435 of the double planetary gear set 436 and the sun gear 437 of the single planetary gear set 441. The drum member 452A of the high range clutch 452 for the high speed gear train is connected to the second reaction shaft 444 and the hub member 452B to the shaft 53 of the first pump-motor 5 by way of a pair of meshing gears 457A and 458A. Thus, the low and high range clutches 451 and 452 are assembled in series with the intermediate and output shafts 3A and 4 and the planetary gear unit 430.

Figure 25:
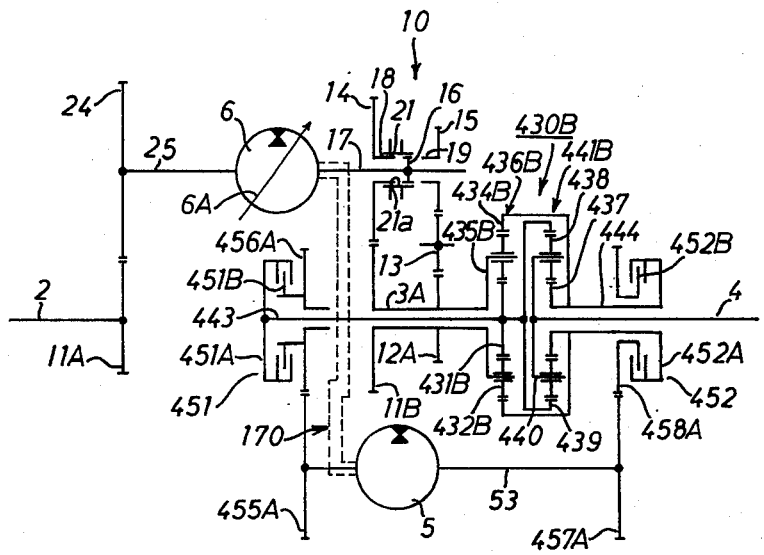

FIG. 25 illustrates a second preferred modification of the fifth preferred embodiment of the present invention. This second modification is distinguished from the first modification of the fifth preferred embodiment by the construction of a planetary gear unit 430B which replaces the planetary gear unit 430 of the first modification. All other constructions and functions remain unchanged and the same reference numerals and characters are used for the same component parts and portions.

The planetary gear unit 430B includes a first single planetary gear set 436B and a second single planetary gear set 441B. The first planetary gear set 436B includes a sun gear 431B fixed on the first reaction shaft 443 at its outer portion, a ring gear 434B secured on the second reaction shaft 444 and a planet gear 432B journalled by a carrier 435B united with intermediate shaft 3A. The second single planetary gear set 441B includes the sun gear 437 united with the second reaction shaft 444, the ring gear 439 secured on the outer end of the first reaction shaft 443 and the planet gear 438 journalled by the carrier 440 secured on the inner end of the output shaft 4. The whole size of the first single planetary gear set 436B is just the same as that of the second single planetary gear set 441B. The relative rotations between the intermediate, output, first reaction and second reaction shafts 3A, 4, 443 and 444 are satisfied by the following two equalities as, $Z_s \times N_{443} + Z_r \times N_{444} = (Z_s + Z_r) \times N_3$
$Z_s \times N_{444} + Z_r \times N_{443} = (Z_s + Z_r) \times N_4$ Each character in the above equalities is defined as follows, $Z_s$ .... Tooth number of the sun gears 431B and 437,
$Z_r$ .... Tooth number of the ring gears 434B and 439,
$N_3$ .... Rotation speed of the intermediate shaft 3A,
$N_4$ .... Rotation speed of the output shaft 4,
$N_{443}$ .. Rotation speed of the first reaction shaft 443, and
$N_{444}$ .. Rotation speed of the second reaction shaft 444.

All the operation features and procedures are same as in the first modification and no repetition is made hereinafter.

Figure 26:
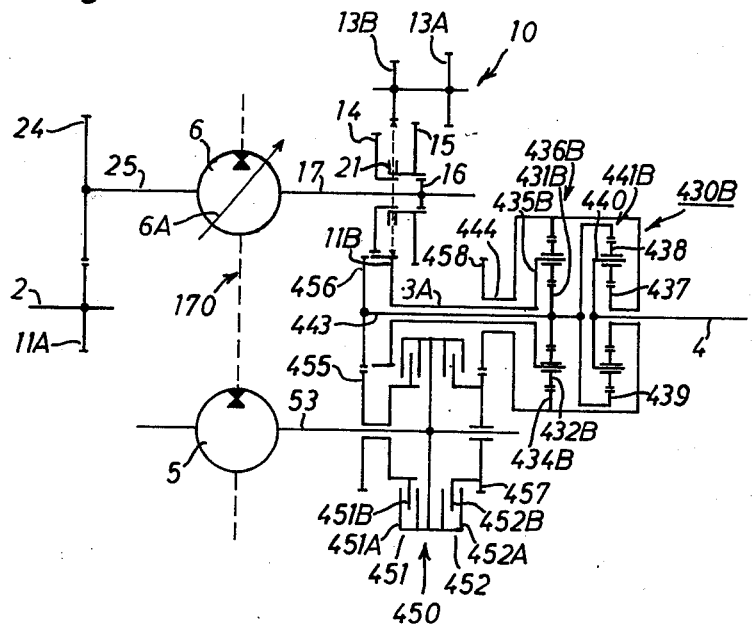

A third modification of the fifth preferred embodiment is disclosed in reference with FIG. 26, wherein a single difference from the above second modification is the construction and arrangement of the hydraulically operated clutch mechanism 450 which is, in this instance, of the same type and arrangement as applied to the fifth preferred embodiment. All other constructions and functions remain unchanged and the same reference numerals and characters are used for the same component parts and portions.

In this third modification, therefore, the outer end of the second reaction shaft 444 is united with the ring gear 434B of the first single planetary gear set 436B and the gear 458 fixed on the inner end of the second reaction shaft 444 is in mesh with the gear 457 of the clutch mechanism 450.

All the operation features and procedures remain unchanged and no repetition is made hereinafter.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A steplessly adjustable hydrostatic-mechanical compound transmission, comprising:
   an input drive shaft;
   a four-shaft drive system disposed upon the output side of said transmission, one of said four shafts being the output drive shaft, and the other three of said four shafts being mechanically and hydrostatically driven by means of said input drive shaft and mechanically connected to said output drive shaft for driving the same;
   a hydrostatic speed differential drive means including a first, non-adjustable positive displacement pump-motor, and a second positive displacement pump-motor driven by means of said input shaft and adjustable in both directions of pumping and which is disposed, along with said first pump-motor, in a closed hydraulic circuit serving as hydraulic communication means between said two pump-motors;
   a drive power train selector means including a two-speed reversing drive means, having two operative mode positions and a neutral position, interposed between and connecting said input drive shaft with one of said three shafts, said first displacement pump-motor being connected, through means of a hydraulic coupling drive, with the other two of said three shafts; and
   operating means disposed within said selector means and operatively connected with an adjustment means of said second adjustable pump-motor for facilitating synchronization of the movement of said reversing drive means between said two operative mode positions.

2. A hydrostatic transmission as claimed in claim 1, wherein said selelctor means comprises a counter shaft drivingly connected with said speed differential means, a forward and a reverse gear trains drivingly connected with said input shaft, and a shift means for selectively engaging said forward and reverse gear trains to said counter shaft, whereby the meshing engagement between said counter shaft and said forward or reverse gear train is synchronously completed upon shifting operation of said shift means.

3. A hydrostatic transmission as claimed in claim 1, wherein said selector means comprises a counter shaft drivingly connected with said second pump-motor, a forward and a reverse gear trains drivingly connected with said speed differential means, and a shift means for selectively engaging said forward and reverse gear trains to said counter shaft, whereby the meshing engagement between said counter shaft and said forward or reverse gear train is synchronously completed upon shifting operation of said shift means.

4. A hydrostatic transmission as claimed in claim 1, further including short circulating means which comprises:
  a bypass valve for normally bypassing the communication between said first and second pump-motors, and
  a first hydraulic actuating means drivingly connected with said input means for operating said bypass valve to complete the closed circuit between said first and second pump-motors.

5. A hydrostatic transmission as claimed in claim 4, wherein said bypass valve is provided with a second actuating means for temporarily operating said bypass valve to complete the closed circuit between said first and second pump-motors prior to the shifting operation of said selector means.

6. A hydrostatic transmission as claimed in claim 1, wherein said speed differential means comprises:
  a differential gear unit disposed between said selector means and said output shaft and including at least a reaction element therein, and
  a frictional engagement mechanism operatively connected with said first pump-motor for selectively engaging said reaction element to said first pump-motor so as to control said differential gear unit in response to the displacement ratio of said second pump-motor.

7. A hydrostatic transmission as claimed in claim 1, wherein said speed differential means comprises:
  planetary gear means interposed between said selector means and said output shaft for providing a continuously variable speed drive gear train, and
  clutch means operatively connected with said first pump-motor for selectively connecting a reaction element for said planetary gear means to said first pump-motor.

8. A hydrostatic transmission as claimed in claim 1, wherein said speed differential means comprises:
  a first and a second planetary gear means interposed between said selector means and said output shaft for continuously providing a low and a high speed drive gear trains, and
  a low and a high range clutch means operatively connected with said first pump-motor for selectively engaging said first pump-motor to reaction elements for said first and second planetary gear means respectively.

9. A hydrostatic transmission as claimed in claim 1, wherein said speed differential means comprises:
  a differential gear means including a first shaft drivingly connected with said input shaft through said selector means, a first sun gear provided on said first shaft, a second sun gear connected with said output shaft, a third sun gear united with a first reaction shaft in surrounding relationship to said first shaft, a second reaction shaft in surrounding relationship to said first reaction shaft, a carrier means united with said second reaction shaft, and planet gears coaxially journalled on said carrier means and in mesh with said first, second and third sun gears, and
  a frictional engagement mechanism including a first and a second clutch means operatively connected with said first pump-motor for selectively engaging said first pump-motor to said first and second reaction shafts.

10. A hydrostatic transmission as claimed in claim 1, wherein said speed differential means comprises:
  a frictional engagement mechanism including a first and a second clutch means operatively connected with said first pump-motor, and
  a differential gear means including a first shaft drivingly connected with said input means by way of said selector means, and a first and a second single planetary gear means interposed between said first shaft and said output means;
  said first single planetary gear means comprising a first sun gear mounted on said first shaft, a ring gear united with a first reaction element drivingly connected with said first clutch means and a first planet gear journalled by a fdirst carrier means connected with said output means and in mesh with said first ring gear and said first sun gear; and
  said second single planetary gear means comprising a second sun gear united with a second reaction element drivingly connected with said second clutch means, a second ring gear united with said first carrier means, and a second planet gear journalled by a second carrier means connected with said first shaft and in mesh with said second sun gear and said second ring gear.

11. A hydrostatic transmission as claimed in claim 1, wherein said speed differential means comprises
  a first and a second clutch means operatively connected with said first pump-motor, and
  a differential gear unit including a first shaft drivingly connected with said input means by way of said selector means, a first sun gear mounted on said first shaft, a ring gear united with a first reaction element drivingly connected with said first clutch means, a second sun gear united with a second reaction element drivingly connected with said second clutch means, a pair of planet gears united to each other and in mesh with said first and second sun gears, and a carrier means connected with said output means for journalling said planet gears.

12. A hydrostatic transmission as claimed in claim 1, wherein said speed differential means comprises
  a first and a second clutch means operatively connected with said first pump-motor, and
  a differential gear unit including a first shaft drivingly connected with said input means by way of said selector means, and a single planetary gear means and a double planetary gear means interposed between said first shaft and said output means;
  said single planetary gear means comprising a first sun gear united with a second reaction element drivingly connected with said second clutch means, a first planet gear journalled by a carrier means connected with said output means and in mesh with said first sun gear, and a first ring gear united with a first reaction element drivingly connected with said first clutch means; and said double planetary gear means comprising a second sun gear united with said second reaction element, a second ring gear connected with said first shaft, a second planet gear journalled by said carrier means and in mesh with said second sun gear, and a third planet gear journalled by said carrier means and in mesh with said second planet gear and said second ring gear.

13. A hydrostatic transmission as claimed in claim 12, wherein said single planetary gear means comprises a first sun gear united with a first reaction element drivingly connected with said first clutch means, a first planet gear journalled by a first carrier means connected with said output means and in mesh with said first sun gear, and a first ring gear united with a second reaction element drivingly connected with said second clutch means and in mesh with said first planet gear; and said double planetary gear means comprises a second sun gear united with said second reaction element, a second ring gear united with said first carrier means, a second carrier means connected with said first shaft, and a pair of planet gears journalled on said second carrier means and in mesh with each other, one of said planet gears being in mesh with said second sun gear and the other planet gear being in mesh with said second ring gear.

14. A hydrostatic transmission as claimed in claim 13, wherein said double planetary gear means comprises a second sun gear mounted on said first shaft, a second ring gear united with said first carrier means, a second carrier means united with said second reaction element, a pair of planet gears journalled on said second carrier means and in mesh with each other, one of said planet gears being in mesh with said second sun gear and the other planet gear being in mesh with said second ring gear.

15. A hydrostatic transmission as claimed in claim 12, wherein said single planetary gear means comprises a first sun gear united with a second reaction element drivingly connected with said second clutch means, a first planet gear journalled by a first carrier means connected with said output means and in mesh with said first sun gear, and a first ring gear united with a first reaction element drivingly connected with said first clutch means and in mesh with said first planet gear; and said double planetary gear means comprises a second sun gear united with said first carrier means, a second ring gear united with said first shaft, a second carrier means connected with said second reaction element, and a pair of planet gears journalled on said second carrier means and in mesh with each other, one of said planet gears being in mesh with said second sun gear and the other planet gear being in mesh with said second ring gear.

16. A hydrostatic transmission as claimed in claim 12, wherein said single planetary gear means comprises a first sun gear united with a second reaction element drivingly connected with said second clutch means, a first planet gear journalled by a first carrier means connected with said output means and in mesh with said first sun gear, and a first ring gear united with a first reaction element drivingly connected with said first clutch means and in mesh with said first planet gear; and said double planetary gear means comprises a second sun gear united with said first reaction element, a second ring gear united with said first shaft, a second carrier means connected with said second reaction element, and a pair of planet gears journalled on said second carrier means and in mesh with each other, one of said planet gears being in mesh with said second sun gear and the other planet gear being in mesh with said second ring gear.

17. A hydrostatic transmission as claimed in claim 1, wherein said speed differential means comprises
a first and a second clutch means operatively connected with said first pump-motor, and
a differential gear unit including a first shaft drivingly connected with said input means by way of said selector means, and a first and a second single planetary gear means interposed between said first shaft and said output means;
said first single planetary gear means comprising a first sun gear united with a first reaction element drivingly connected with said first clutch means, a first planet gear journalled by a first carrier means connected with said first shaft and in mesh with said first sun gear, and a first ring gear united with a second reaction element drivingly connected with said second clutch means and in mesh with said first planet gear; and
said second single planetary gear means comprising a second sun gear united with said second reaction element, a second planet gear journalled by a carrier means connected with said output means and in mesh with said second sun gear, and a second ring gear united with said first reaction element and in mesh with said second planet gear.

* * * * *